US011543259B2

(12) United States Patent
Gokhale et al.

(10) Patent No.: US 11,543,259 B2
(45) Date of Patent: Jan. 3, 2023

(54) DETERMINING LANDMARK DETECTABILITY

(71) Applicant: Hitachi, Ltd., Tokyo (JP)

(72) Inventors: Akshay Gokhale, Farmington Hills, MI (US); Subrata Kumar Kundu, Canton, MI (US)

(73) Assignee: HITACHI, LTD., Tokyo (JP)

( * ) Notice: Subject to any disclaimer, the term of this patent is extended or adjusted under 35 U.S.C. 154(b) by 109 days.

(21) Appl. No.: 16/893,575

(22) Filed: Jun. 5, 2020

(65) Prior Publication Data
US 2021/0381845 A1 Dec. 9, 2021

(51) Int. Cl.
G01C 21/36 (2006.01)
G01C 21/34 (2006.01)
(52) U.S. Cl.
CPC ..... G01C 21/3644 (2013.01); G01C 21/3461 (2013.01); G01C 21/3691 (2013.01)
(58) Field of Classification Search
CPC ............ G01C 21/3644; G01C 21/3461; G01C 21/3691
See application file for complete search history.

(56) References Cited

U.S. PATENT DOCUMENTS

2017/0314954 A1* 11/2017 Golding ............ G01C 21/3602
2018/0066960 A1   3/2018 Tateishi et al.
2019/0120640 A1*  4/2019 Ho ......................... G06Q 10/04
2020/0349368 A1* 11/2020 Mayster ............ G01C 21/3602
2021/0172753 A1*  6/2021 Johnson, Jr. ........... G06N 20/00

FOREIGN PATENT DOCUMENTS

WO    WO-2015128085 A1 *  9/2015   .......... H04W 64/006
WO    WO-2020021022 A1 *  1/2020   ............ G01C 21/26

OTHER PUBLICATIONS

WO2015128085A1 English Translation.*
WO2020021022A1 Enolish Translation.*
Clark F. Olson, et al., "Maximum Likelihood Rover Localization by Matching Range Maps", Proceedings of the IEEE International Conference on Robotics and Automation, 1998, pp. 272-277.

* cited by examiner

Primary Examiner — Rami Khatib
(74) Attorney, Agent, or Firm — Mattingly & Malur, PC

(57) ABSTRACT

In some examples, a system may receive location information. The system may determine at least one landmark based on the location information. In addition, the system may determine one or more current conditions for the at least one landmark. Further, the system may receive sensor configuration information. Based on the sensor configuration information and the one or more current conditions, the system may determine the detectability of the at least one landmark.

20 Claims, 14 Drawing Sheets

| Attributes | Description | Detection quality |
|---|---|---|
| Horizontal Line Type | Stop Line | Detection Score: 0.0314 |
| Attribute | White Solid Line | |
| Virtual/ Real | Boolean Flag: 0 virtual, 1 real | |
| Geometry | End points and width | |
| Location | Latitude and Longitude of end points | |

FIG. 11

| Attributes | Description | Detection quality |
|---|---|---|
| Drivable lane | Standard lane | |
| Quality | High quality | |
| Curvature | 0.3 | |
| Geometry | Left: Lane border width<br>Right: Lane border width<br>Left lane length (total)<br>Right lane length (total) | |
| Lane border type | Left: Dash<br>Right: Dash | |
| Left Lane Border Location | Latitude and longitude of start and end points | Detection Score: 0.0023 |
| Right Lane Border Location | Latitude and longitude of start and end points | Detection Score: 0.0453 |
| Material | Material of left lane and right lane boarder | |
| Lane border color | Left: White<br>Right: White | |

FIG. 12

| Attributes | Description | Detection quality |
|---|---|---|
| Wall Type | Building wall | Detection Score: 0.0013 |
| Wall Geometry | Length and height of wall | |
| Wall features | Flat wall | |
| Wall color | Grey | |
| Wall location | Start and end edges latitude and longitude | |

FIG. 13

| Attributes — 1102 | Description — 1104 | Detection quality — 1106 |
|---|---|---|
| Category | Stop Sign | Detection Score: 0.23 |
| Color | Red | |
| Shape | Octogon | |
| Face size | | |
| Heading | Azimuth of sign relative to equator | |
| Detailed Geometry | Detail geometric information size shape center of mass height w.r.t road plane, etc. | |
| Location | Latitude and longitude of sign | |

FIG. 14

DETERMINING LANDMARK DETECTABILITY

BACKGROUND

Advanced driver assistance systems (ADAS) and semi-autonomous vehicle systems, self-driving systems, or otherwise autonomous driving (AD) systems are systems that automate or otherwise enhance vehicle control for improved safety, automated navigation, and the like. Conventional navigation systems in traditional vehicles may typically provide one or more routing options for traveling from a source location to a destination location. Examples of factors considered by conventional navigation systems when determining routing options may include time to destination, traffic conditions, whether tolls are required, and the like. However, in the case of vehicles equipped with modern ADAS and AD systems, determining navigation routes using just these factors may not be sufficient for ensuring occupant safety and/or correct vehicle navigation.

SUMMARY

In some implementations, a system may receive location information. The system may determine at least one landmark based on the location information. In addition, the system may determine one or more current conditions for the at least one landmark. Further, the system may receive sensor configuration information. Based on the sensor configuration information and the one or more current conditions, the system may determine the detectability of the at least one landmark.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 11 illustrates an example data structure of landmark information stored in the landmark database according to some implementations.

FIG. 12 illustrates an example data structure of landmark information stored in the landmark database according to some implementations.

FIG. 13 illustrates an example data structure of landmark information stored in the landmark database according to some implementations.

FIG. 14 illustrates an example data structure of landmark information stored in the landmark database according to some implementations.

DESCRIPTION

Figure 1:
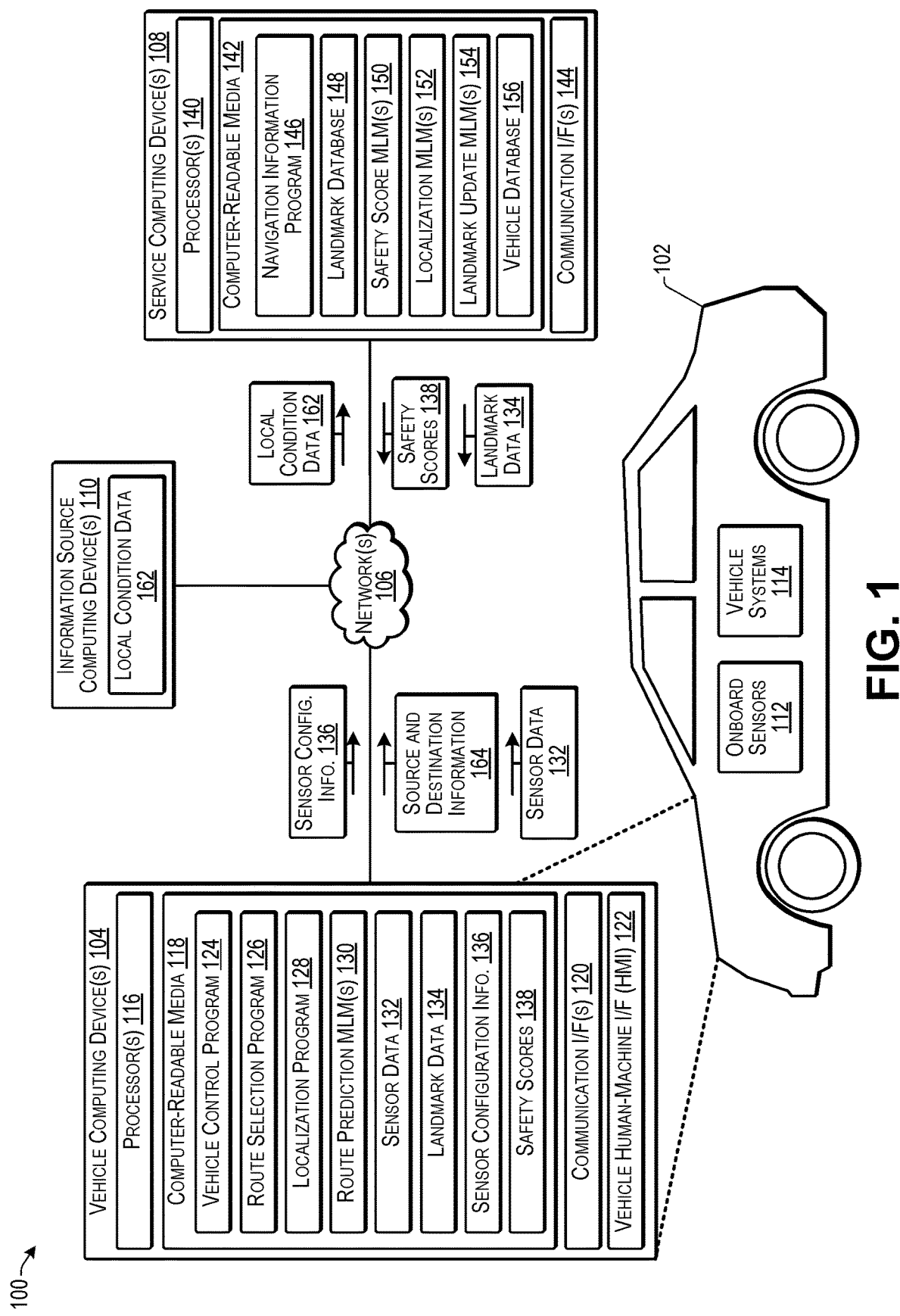
FIG. 1 illustrates an example landmark detection and vehicle navigation system according to some implementations.

Some implementations herein are directed to techniques and arrangements for selecting landmarks available in a navigation map by taking into consideration various factors such as weather conditions, time of day, traffic conditions, lighting conditions, the sensor configuration on the specific vehicle, and so forth, when determining the usability of the available landmarks. For instance, if the landmarks are usable, the vehicle is predicted to be able to localize itself on a corresponding map, thereby providing safer and more accurate navigation. On the other hand, if the landmarks on at least a portion of a candidate route are determined to not be currently useable, the candidate route might not be selected.

Some examples herein employ landmark-based localization in ADAS and AD applications to localize a vehicle position with respect to a map, such as high definition (HD) map. An HD map may provide extremely high precision to enable an autonomous vehicle to maneuver itself within a 3D space. One technique employed herein for enabling the vehicle to locate itself with respect to the map (localization) is for the vehicle to determine its location with respect to the real world positions of various landmarks identified on the HD map. For example, the predicted quality and effectiveness of localization may be based at least in part on the landmarks available along each of a plurality of possible routes that may be navigated.

There are various types of landmarks such as buildings, road curbs, lane markers, trees, poles, traffic signs, etc., that may be included on an HD map. Some implementations herein may determine the detectability of these landmarks based on considerations such as sensor type or quality on the vehicle, as well as current external factors such as weather conditions, time of day, lighting conditions, and so forth. If the landmarks are detected correctly, they can be effectively matched with corresponding landmarks on the HD map to localize the vehicle with respect to the HD map. Accordingly, some implementations herein may determine in advance which landmarks can be detected effectively considering the external factors mentioned above and considering the sensor configuration of the vehicle.

The system herein may include a vehicle navigation human-machine interface (HMI) located on the vehicle for enabling a human to interact with the navigation framework herein. The system may further include a global landmark database stored at an network storage location, such as at a service computing device 108 or the like. In addition, the system may include one or more machine learning models (MLMs) or other types of algorithms for determining a safety score prediction for determining the predicted safety of possible navigation routes. Further, the system may include one or more MLMs or other types of algorithms for determining localization. In some examples, the localization MLM(s) or other algorithm(s), and the safety score MLM(s) or other algorithm(s), may be executed on a service computing device remote from the vehicle, and the corresponding information may be provided to the vehicle prior to or during vehicle navigation.

Further, the system may include one or more MLMs or other type of algorithms for performing route selection. In some cases, the route selection MLM(s) or other algorithm(s) may be executed on an autonomous driving (AD) electronic control unit (ECU) or other computing device on board the vehicle. In addition, a vehicle ECU or other computing device on board the vehicle may execute a localization program for determining a location of the vehicle with respect to the HD map based on identifying landmarks from the map. Additionally, the system may include a landmark update MLM or other algorithm for updating the landmark database following completion of a navigated trip. In some examples, the landmark update MLM or other algorithm may be executed on a service computing device remote from the vehicle.

Some examples herein include navigation techniques for ADAS and/or AD systems. Further, some examples include a method and/or system to select landmarks for routing and localization by taking into consideration various current different local conditions to provide improved safety to vehicle occupants. For instance, the routing and localization employed herein may enable a determination of vehicle controllability when operating in an autonomous mode prior to starting a trip. For example, by localizing itself accurately within a map, the vehicle is able to navigate through the map seamlessly. Implementations herein provide techniques for improving localization quality and effectiveness for determining whether a vehicle will be able to traverse a proposed route safely and correctly. Thus, the predicted localization accuracy herein may take into account various factors such as type, location and field of view of the sensors used on the vehicle, as well as weather conditions (e.g., rain, snow, fog), visibility (such as day vs night), and so forth.

Determining the localization accuracy in advance enables the vehicle computing device to evaluate the vehicle capability to drive on a given route autonomously for a plurality of possible routes. To ensure safety of an autonomous vehicle and its occupants, the localization accuracy may be very high, e.g., within tens of centimeters. The localization accuracy may rely at least in part on sensor capabilities for detecting landmarks and matching the detected landmarks with the map landmarks on the HD map or other map being used for navigation. Consequently, implementations herein may achieve this level of accuracy by selecting landmarks that are predicted to provide superior results for localization.

A route selection program executed by the vehicle computing device may determine whether the destination has been provided by a user at the start of every trip. If the destination has not been provided, the route selection program may predict the destination, such as by using a destination prediction MLM and/or based on information received via a voice communication interface or other HMI. After the destination has been determined, possible routes from the source location to the destination location may be determined and divided into road segments. For instance, multiple feasible segments from the source location may be determined and external information may be received for each segment, e.g., from a Web server any of various other information source computing devices available over a network.

Examples of external information that may be received may include weather conditions, time of day, traffic conditions, lighting conditions, local events taking place, etc. The current sensor configuration of the vehicle may also be received, e.g., from a vehicle ECU, vehicle storage location, or the like. A localization program executed by the vehicle computing device may determine landmarks from the landmark database located at the network location, and may determine a respective weight for each landmark along each route segment based at least on the factors mentioned above. The respective weight for the landmark along each road segment may then be used to determine the quality or effectiveness of localization along the road segment. This process may be performed iteratively until all road segments are determined for the designated destination.

A safety score may be determined for each feasible route based on the determined road segment scores. In some examples, the safety score may be used for route selection in conjunction with various other considerations such as time, cost, efficiency, and the like, for all feasible routes. The route selection program may be executed to determine which landmarks to use for localization, and may select one of the routes as being the optimal route. At the end of each trip the landmark database may be updated with newly detected landmarks and/or landmarks detected in varied local conditions, such as weather, time, lighting, etc.

For discussion purposes, some example implementations are described in the environment of selecting and navigating a travel path for a vehicle based on available sensors and local conditions. However, implementations herein are not limited to the particular examples provided, and may be extended to other types of sensing devices, other types of vehicles, other types of local conditions, other types of landmarks, and so forth, as will be apparent to those of skill in the art in light of the disclosure herein. For example, the solution herein is scalable, and may be applied to ubiquitous systems in addition to ground vehicles, such as in the case of the mining industry for heavy mining trucks, marine industry for ships, agricultural industry for agriculture equipment, and so forth. Implementations herein may also be scaled to smaller applications, such as logistic robots and/or autonomous bikes, such as within geo-fenced areas with fewer parameters.

FIG. 1 illustrates an example landmark detection and vehicle navigation system 100 according to some implementations. The system 100 includes a vehicle 102 having one or more vehicle computing devices 104 able to communicate over one or more networks 106 with one or more service computing devices 108. In addition, the service computing device(s) 108, and in some cases, the vehicle computing device(s) 104 may be able to communicate over the one or more networks 106 with one or more information source computing devices 110, such as web servers, service providers, public databases, private databases, or the like. The vehicle 102 may further include one or more sensors 112 and one or more vehicle systems 114 that are in communication with the vehicle computing device(s) 104, such as via a CAN bus (controller area network bus) (not shown in FIG. 1) or the like.

Each vehicle computing device 104 may include one or more processors 116, one or more computer-readable media 118, one or more communication interfaces (I/Fs) 120, and one or more vehicle human-machine interfaces (HMIs) 122. In some examples, the vehicle computing device(s) 104 may include one or more ECUs (electronic control units) or any of various other types of computing devices. For instance, the computing device(s) 104 may include one or more ADAS/AD ECUs for controlling at least some of the vehicle systems 114, such as to perform ADAS and/or AD tasks, such as navigation, braking, steering, acceleration, deceleration, and so forth. The computing device(s) 104 may also include one or more other ECUs, such as for controlling other systems of the vehicle systems 114.

"ECU" is a generic term for any embedded processing system that controls one or more of the systems, subsystems, or components in a vehicle. Software, such as a vehicle control program 124, a route selection program 126, and a localization program 128 may be executed by one or more ECUs and may be stored in a portion of the computer-readable media 118 (e.g., program ROM, solid state storage, etc., as discussed below) associated with the respective ECU to enable the ECU to operate as an embedded system. ECUs may typically communicate with each other over a vehicle bus, such as the CAN bus mentioned above, according to a vehicle bus protocol. As an example, the CAN bus protocol is a vehicle bus protocol that allows ECUs and the vehicle systems 114 to communicate with each other without a host computer. CAN bus may include at least two different types. For example, high-speed CAN may be used in applications where the bus runs from one end of the environment to the other, while fault-tolerant CAN is often used where groups of nodes are connected together.

Each ECU or other vehicle computing device 104 may include one or more processors 116, which may include one or more of central processing units (CPUs), graphics processing units (GPUs), microprocessors, microcomputers, microcontrollers, digital signal processors, state machines, logic circuits, and/or any devices that manipulate signals based on operational instructions. As one example, the processor(s) 116 may include one or more hardware processors and/or logic circuits of any suitable type specifically programmed or configured to execute the algorithms and other processes described herein. The processor(s) 116 may be configured to fetch and execute computer-readable instructions stored in the computer-readable media 118, which may program the processor(s) 116 to perform the functions described herein.

The computer-readable media 118 may include volatile and nonvolatile memory and/or removable and non-removable media implemented in any type of technology for storage of information, such as computer-readable instructions, data structures, programs, program modules, and other code or data. For example, the computer-readable media 118 may include, but is not limited to, RAM, ROM, EEPROM, flash memory or other memory technology, optical storage, solid state storage, magnetic disk, cloud storage, or any other medium that can be used to store the desired information and that can be accessed by a computing device. Depending on the configuration of the vehicle computing device(s) 104, the computer-readable media 118 may be a tangible non-transitory medium to the extent that, when mentioned, non-transitory computer-readable media exclude media such as energy, carrier signals, electromagnetic waves, and/or signals per se. In some cases, the computer-readable media 118 may be at the same location as the vehicle computing device 104, while in other examples, a portion of the computer-readable media 118 may be remote from the vehicle computing device 104.

The computer-readable media 118 may be used to store any number of functional components that are executable by the processor(s) 116. In many implementations, these functional components comprise instructions or programs that are executable by the processor(s) 116 and that, when executed, specifically program the processor(s) 116 to perform the actions attributed herein to the vehicle computing device 104. Functional components stored in the computer-readable media 118 may include the vehicle control program 124, the route selection program 126, and the localization program 128, each of which may include one or more computer programs, applications, executable code, or portions thereof. Further, while these programs are illustrated together in this example, during use, some or all of these programs may be executed on separate vehicle computing device(s) 104. Alternatively, in some examples, each of these programs 124, 126 and 128 may be part of a single program.

In addition, the computer-readable media 118 may store data, data structures, machine-learning models, and other information used for performing the functions and services described herein. For example, the computer-readable media 118 may store one or more route prediction machine-learning models (MLMs) 130 that may be used by the route selection program 126 during route selection. Additionally, the computer-readable media 118 may store sensor data 132 received from the onboard sensors 112, and which may include information about landmarks detected during a trip. In addition, the computer-readable media 118 may store landmark data 134, which may be received from the service computing device(s) 108, as discussed additionally below. Furthermore, the computer-readable media 118 may store sensor configuration information 136, which may indicate the current type, field of view, and status of the onboard sensors 112. Further, the computer-readable media 118 may store safety scores 138, which may be received from the service computing device(s) 108, as discussed additional below.

Further, while the data, data structures and MLM(s) are illustrated together in this example, during use, some or all of these elements may be stored on separate ones of the computing device(s) 104. The computing device(s) 104 may also include or maintain other functional components and data, which may include programs, drivers, etc., and the data used or generated by the functional components. Further, the computing device(s) 104 may include many other logical, programmatic, and physical components, of which those described above are merely examples that are related to the discussion herein.

The one or more communication interfaces 120 may include one or more software and hardware components for enabling communication with various other devices, such as over the CAN bus and/or over one or more network(s) 106. For example, the communication interface(s) 120 may enable communication through one or more of a LAN, the Internet, cable networks, cellular networks, wireless networks (e.g., Wi-Fi) and wired networks (e.g., CAN, Fibre Channel, fiber optic, Ethernet), direct connections, as well as close-range communications such as BLUETOOTH®, and the like, as additionally enumerated elsewhere herein.

The one or more networks 106 may include any appropriate network, including a wireless network, such as a cellular network; a wide area network, such as the Internet; a local area network, such an intranet; a local wireless network, such as Wi-Fi; close-range wireless communications, such as BLUETOOTH®; a wired network, including fiber optics and Ethernet; any combination thereof, or any other suitable communication network. Components used for such communication technologies can depend at least in part upon the type of network, the environment selected, or both. Protocols for communicating over such networks are well known and will not be discussed herein in detail.

The sensor data 132 may include sensor data received from the onboard sensors 112. For example, the onboard sensors 112 may include any of a plurality of different types of sensors such as a camera system, radar, LIDAR, ultrasound, a global navigation satellite system (GNSS) receiver (referred to hereinafter by the common usage name "GPS", which is also intended to be inclusive of any other satellite navigation system), accelerometers, a compass, and the like. In addition, the sensor data 132 used by the vehicle control program 118 may include information received from or associated with various vehicle systems 114, such as (not shown in FIG. 1) from a suspension controller associated with the suspension system, a steering controller associated with the steering system, a vehicle speed controller associated with a braking and acceleration system, and so forth.

For example, the vehicle control program 118 may use rule-based and or artificial-intelligence-based control algorithms to determine parameters for vehicle control. For instance, the vehicle control program 118 may determine an appropriate action, such as braking, steering, accelerating, or the like, and may send one or more control signals to one or more vehicle systems 114 based on the determined action. For example, the vehicle control program 118 may send control signals to the suspension controller, the steering controller, and/or the vehicle speed controller for controlling or partially controlling the vehicle in some applications.

The service computing device(s) 108 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the functional components and data of the service computing device 108 as being present in a single location, these components and data may alternatively be distributed across different computing devices and different locations in any manner. Consequently, the functions may be implemented by one or more service computing devices, with the various functionality described herein distributed in various ways across the different computing devices. Multiple service computing devices 108 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 108 may include one or more processors 140, one or more computer-readable media 142, and one or more communication interfaces 144. Each processor 140 may be a single processing unit or a number of processing units, and may include single or multiple computing units or multiple processing cores. The processor(s) 140 can be implemented as one or more microprocessors, microcomputers, microcontrollers, digital signal processors, central processing units, state machines, logic circuitries, and/or any devices that manipulate signals based on operational instructions. For instance, the processor(s) 140 may be one or more hardware processors and/or logic circuits of any suitable type specifically programmed or configured to execute the algorithms and processes described herein. The processor(s) 140 can be configured to fetch and execute computer-readable instructions stored in the computer-readable media 142, which can program the processor(s) 140 to perform the functions described herein.

The computer-readable media 142 may include volatile and nonvolatile memory and/or removable and non-removable media implemented in any type of technology for storage of information, such as computer-readable instructions, data structures, program modules, or other data. Such computer-readable media 142 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the service computing device 108, the computer-readable media 142 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 142 may be used to store any number of functional components that are executable by the processors 140. In many implementations, these functional components comprise instructions or programs that are executable by the processors 140 and that, when executed, specifically configure the one or more processors 140 to perform the actions attributed above to the service computing device 108. Functional components stored in the computer-readable media 142 may include a navigation information program 146 that may be executed to configure the service computing device 108 to determine and send navigation information, such as safety scores 138 and landmark data 134, to the vehicle computing device 104. For example, the navigation information program 146 may configure the service computing device 140 to retrieve landmark data from a landmark database 148 or other landmark data structure, and send the landmark data 134 to one or more of the vehicles 102 for use in localizing the vehicle with respect to map location.

In some examples, the service computing device 108 may receive the sensor data 132 including landmark detection information from a plurality of vehicles 102 that traverse the same travel path. The service computing device may aggregate the landmark information from a plurality of vehicles 102 to enable detection and identification of the particular landmarks more accurately, and for determining which landmarks are detectable under which types of local conditions.

In addition, the computer-readable media 142 may store data used for performing the operations described herein. Thus, the computer-readable media 142 may include the landmark database 148, as discussed above. In addition, the computer-readable media 142 may store one or more MLMs, such as a safety score MLM 150, a localization MLM 152, and a landmark update MLM 154, as discussed additionally below. In addition, the computer-readable media 142 may store a vehicle database 156 that may include information about each vehicle that uses the system 100, which may include contact information and the sensor configuration information 136. Further, the service computing device 108 may also include or maintain other functional components and data not specifically shown in FIG. 2, which may include programs, drivers, etc., and the data used or generated by the functional components. Additionally, the service computing device 108 may include many other logical, programmatic, and physical components, of which those described above are merely examples that are related to the discussion herein. Examples of MLMs that may be used in some examples herein may include predictive models, decision trees, classifiers, regression models, such as linear regression models, support vector machines, stochastic models, such as Markov models and hidden Markov models, and artificial neural networks, such as self-organizing neural networks, recurrent neural networks, convolutional neural networks, modular neural networks, and so forth.

The communication interface(s) 144 may include one or more interfaces and hardware components for enabling communication with various other devices, such as over the network(s) 106. For example, communication interface(s) 144 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The information source computing device(s) 110 may include a hardware configurations similar to the service computing devices 108 described above, but with different functional components and data stored thereon or associated there with. For example, the information source computing devices 110 may store and provide local condition data that may be provided to the service computing device 108 for indicating the current condition of specified road segments as discussed additionally below.

As one example, the vehicle computing device 104 may provide source and destination information 164 for a trip to the service computing device 108. In response, when analyzing possible routes, the service computing device 108 may request local condition data 162 for the possible routes from the information source computing devices 110 to determine current conditions on the possible routes. The service computing device may user the local condition data to determine the safety scores 138 for the possible routes and may send the safety scores to the vehicle computing device 104. The vehicle computing device 104 may determine a selected route based at least in part on the safety scores 138. The service computing device may further determine landmark data 134 for the selected route, and may send the landmark data 134 to the vehicle computing device 104 to enable the vehicle to localize itself while traversing the selected route. Additional details are discussed below.

FIGS. 2, 4-6, 8 and 10 include flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices.

Figure 2:
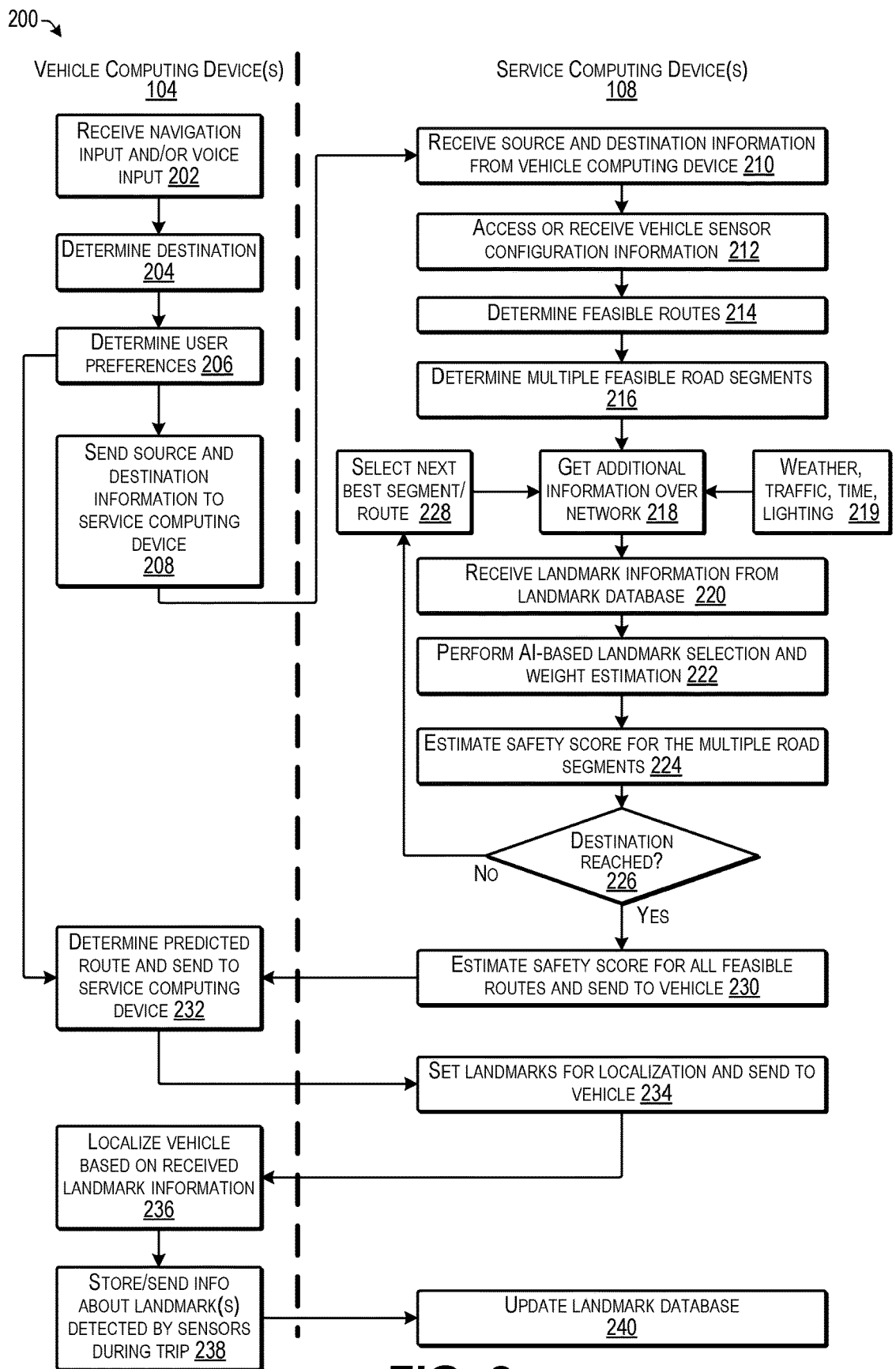
FIG. 2 is a flow diagram illustrating an example process for determining an optimal route according to some implementations.

FIG. 2 is a flow diagram illustrating an example process 200 for determining an optimal route according to some implementations. In some examples, the process 200 may be executed by the system 100 discussed above. For example, a portion of the process 200 may be executed by the vehicle computing devices 104, and another portion of the process 200 may be executed by the service computing devices 108, as indicated by the dashed line. Furthermore, while in this example, certain functions are being illustrated as being performed by one or the other of the computing devices 104 or 108, respectively, it will be readily apparent to those of skill in the art having the benefit of the disclosure herein that some of the functions may be performed by the other one of the computing devices 104 or 108.

At 202, the vehicle computing device 104 may receive navigation input and/or voice input from a vehicle occupant for determining a destination. For example, the route selection program may be executed to determine whether a destination has been provided by a user at the start of a trip. If the destination is not provided, the vehicle computing device 104 may query the user via a voice communication HMI, via a text prompt presented on a display screen, or the like.

At 204, the vehicle computing device 104 may determine the destination for the trip. For example, based on received inputs from the user and/or based on execution of a destination prediction algorithm, the vehicle computing device 104 may determine a destination for the trip. In some examples, a voice communication function of the HMI may provide suggestions to the user based on a predicted destination, inputs received from the user, and so forth, for determining and confirming the destination.

At 206, the vehicle computing device 104 may determine user preferences for the trip. For example, the vehicle computing device may refer to default user preferences, preloaded user preferences, or the vehicle computing device may query the user regarding the user preferences to identify the user preferences for the current trip. As several nonlimiting example, the user preferences may be categorized in a plurality of categories, such as safety, comfort, efficiency, time to destination, cost, and the like, which may be used during route selection, as discussed additionally below.

At 208, the vehicle computing device 104 may send the source and destination information to the service computing device 108. In addition, the vehicle computing device 104 may send sensor configuration information 136 to the service computing device 108 if the service computing device 108 does not already have this information in the vehicle database 156.

At 210, the service computing device 108 may receive the source and destination information sent by the vehicle computing device 104.

At 212, the service computing device 108 may receive or may access vehicle sensor configuration information for the vehicle from which the route and road segment information was received. As mentioned above, in some examples, the vehicle computing device 104 may send the sensor information to the service computing device 108. In other examples, the service computing device 108 may maintain a vehicle database, and may access the sensor configuration information in the vehicle database if the service computing device 108 as previously received the sensor configuration information from the vehicle.

At 214, the service computing device 108 may determine feasible routes for the trip. For instance, the service computing device 108 may determine all possible feasible routes between the source location and the destination location. Typically, there may be a plurality of separate routes available between the source location and the destination location. When there are a large number of feasible routes, the service computing device 108 may narrow down the feasible routes to a smaller number based on various criteria such as a distance difference threshold or the like.

Figure 3:
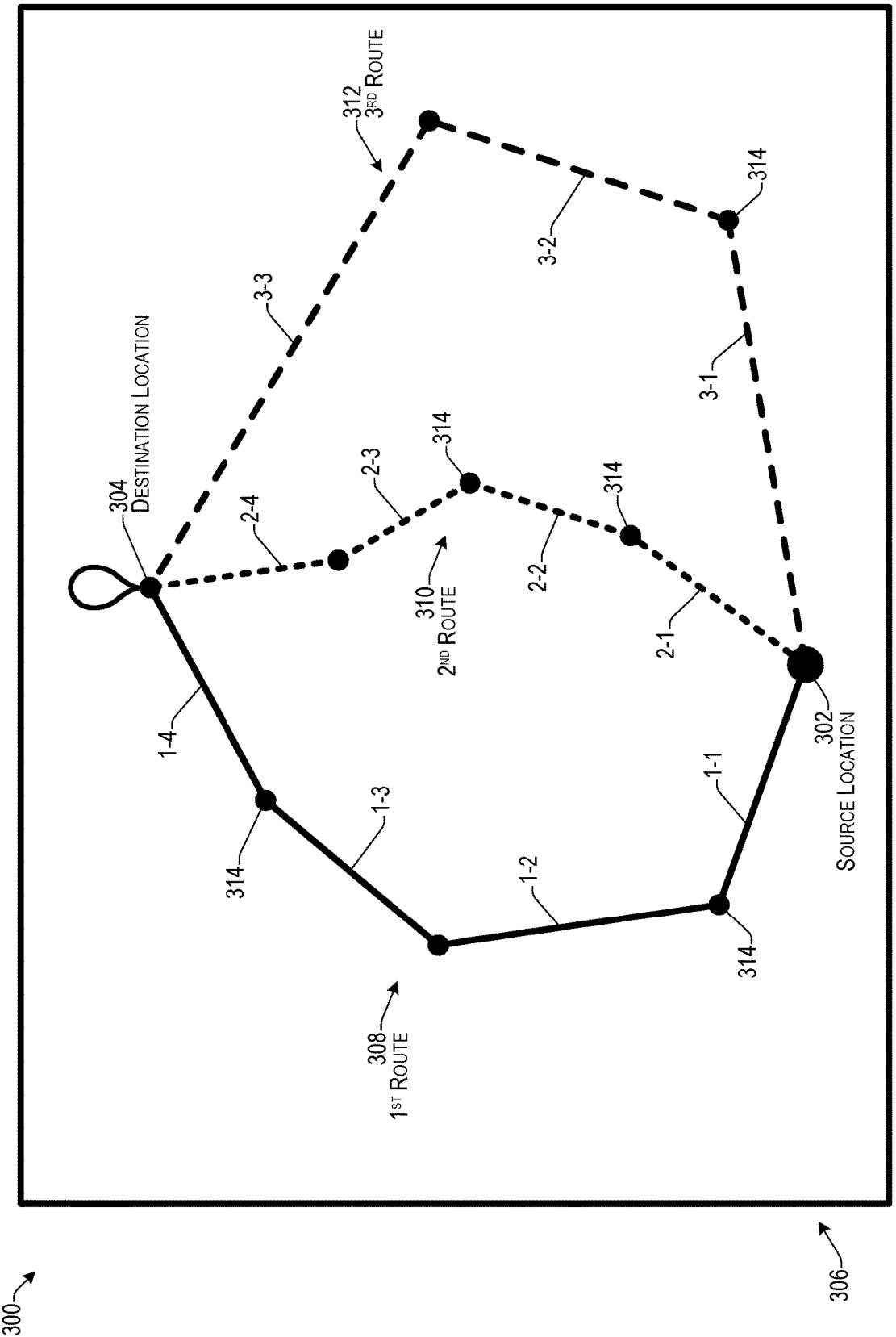
FIG. 3 illustrates an example of determining multiple feasible road segments according to some implementations.

At 216, the service computing device 108 may determine multiple feasible road segments based on the feasible routes identified at 208 above. FIG. 3, discussed below, illustrates an example of routes and road segments.

At 218, the service computing device 108 may get additional information related to the route and road segments over the network(s) 106. For example, the service computing device may connect over the one or more networks 106 to a web server or other information source computing device 110 to obtain additional information about local conditions related to the route and road segments determined for the vehicle 102. For example, as indicated at 219, the service computing device 108 may receive additional information such as weather conditions, traffic conditions, time information, lighting conditions, and so forth.

At 220, the service computing device 108 may receive landmark information from the landmark database. For example, the service computing device 108 may access the landmark database to obtain information about landmarks corresponding to the received route and road segment information.

At 222, the service computing device 108 may perform an AI based landmark selection and weight estimation. For example, the service computing device 108 may select landmarks from the landmark database and determine a corresponding weight for each landmark along the segment depending on the factors mentioned above. The corresponding weights for all the landmarks along each road segment may be used to determine the safety score of the segment. Details of the landmark selection and weight estimation are discussed additionally below, e.g., with respect to FIG. 4.

At 224, the service computing device 108 may estimate a safety score for each of the multiple road segments. As mentioned above, the corresponding weights for all the landmarks along each road segment may be used to determine the safety score of the segment. Details of the safety score estimation are discussed additionally below, e.g., with respect to FIG. 4.

At 226, the service computing device 108 may determine whether the destination is reached by the selected road segments. If so, the process goes to 230. If not, the process goes back to 228 to select a different road segment or route, such as a next best segment or route.

At 230, the service computing device 108 may estimate a safety score for all the feasible routes determined for the vehicle 102, and may send the safety scores to the vehicle computing device 104.

At 232, the vehicle computing device 104 may determine a predicted route based on the safety scores. For example, the safety scores received from the service computing device 108 may be used for route prediction in conjunction with various other scores for various other factors, such as time, cost, efficiency, comfort, etc., for all routes. The route prediction program may first weight the scores for the factors based on the user preferences determined at 206, and may optimize a cost function to identify the optimal route to the destination location. Based on the user preferences, the predicted route may not necessarily be the safest route to the destination location. Details of determining the predicted route are discussed additionally below, e.g., with respect to FIG. 5.

At 234, the service computing device 108 may receive the predicted route from the vehicle computing device 104, may set landmarks for localization for the predicted route, and may send the landmarks to the vehicle computing device 104. For example, because the predicted route may not necessarily be the safest route of the feasible routes, the service computing device 108 may execute a localization MLM, or other localization algorithm, to identify the effective landmarks on the routes in order to enable the vehicle to localize itself accurately. The predicted route information may be used to select the effective landmarks to be used for localization in given weather conditions, time of day, lighting conditions, and traffic conditions. Details of setting the landmarks for localization are discussed additionally below, e.g., with respect to FIG. 6.

At 236, the vehicle computing device 104 may receive the landmark information from the service computing device 108 and may localize the vehicle based on the received landmark information. The localization program 128 may be executed on the vehicle computing device 104 to use the received landmarks and current sensor data to localize the vehicle 102. The localization program 128 may also store the landmarks detected by the sensors in a local storage. Details of localizing the vehicle 102 are discussed additionally below, e.g., with respect to FIG. 8.

At 238, the vehicle computing device 104 may store information about the landmarks detected by the sensors during the trip, and may send the stored information about the landmarks detected by the sensors to the service computing device 108.

At 240, the service computing device 108 may update the landmark database 148 based on the information about the sensed landmarks sent by the vehicle computing device 104. For example, the service computing device 108 may update the landmark database by comparing the sensor data received from the vehicle computing device 104 with the landmark data already available in the landmark database. If the landmark already exists in the landmark database, the current landmark score may be updated based on the given conditions for the trip, such as vehicle sensor configuration, and local condition factors including weather conditions, time of day, lighting, traffic, etc. If the landmark does not already exist in the database, the landmark and its attributes may be added to the landmark database. Accordingly, the landmark database may be continually improved, which also improves the quality of vehicle localization. In some examples, the landmark is generated using landmark data received from a large number of vehicles that use the service computing device 108 for navigation as described in the process 200. Thus, the landmark database may be enriched with a variety of data as vehicle sensor configuration may vary from sensor to sensor and also the detection conditions for the landmarks may vary based on variations in the local conditions. Details about the updating of the landmark database are discussed additionally below, e.g., with respect to FIG. 10.

FIG. 3 illustrates an example 300 of determining multiple feasible road segments according to some implementations. In this example, a source location 302 and a destination location 304 initially determined, e.g., as shown on a map 306. For example, after the destination location 304 has been set, a plurality of feasible routes may be determined. In this example, three feasible routes are illustrated, namely a first route 308, a second route 310, and a third route 312. In other examples, more or fewer feasible routes may be determined. In addition, in the case that there are a very large number of feasible routes, the number of feasible routes may be narrowed using any of various thresholds such as estimated distance traveled along each route, estimated time of travel for each route, or the like. In some cases, the narrowing criteria may be based at least in part on the user preferences.

The feasible routes 308, 310 and 312 may each be segmented into multiple road segments. For example, the first route 308 is segmented into road segments 1-1, 1-2, 1-3 and 1-4; the second route 310 is segmented into road segments 2-1, 2-2, 2-3, and 2-4; and the third route 312 is segmented into road segments 3-1, 3-2 and 3-3. The endpoint/startpoint 314 of each road segment may typically be an intersection or the like. Multiple feasible road segments originating from the source location 302 may be selected for analysis, i.e., road segments 1-1, 2-1 and 3-1, such as for determining respective safety scores, comfort scores, time scores, cost scores, efficiency scores, or the like, as discussed additionally below. Furthermore, while a map is illustrated in FIG. 3 for discussion purposes, in operation it may not be necessary for the service computing device 108 to generate a visual map for performing the analysis of the selected routes and road segments.

As mentioned above, additional information may be requested and received from the information source computing devices 110 for each road segment, such as weather conditions, time of day, traffic conditions, lighting conditions, etc. The sensor configuration information of the vehicle 102 may also be received from vehicle computing device 104 or may be accessed in a vehicle database 156 as discussed above. The service computing device 108 selects landmarks from the global landmark database and determines a corresponding weight for each landmark along the segment depending, at least partially, on the factors mentioned above. The corresponding weight for each of the landmarks along each road segment may be aggregated and used to determine the safety score of the segment. This process may be performed iteratively until all road segments through to the destination location 304 have been analyzed. The safety scores of all routes 308, 310 and 312 may be determined by aggregating the respective safety scores of the respective road segments.

Figure 4:
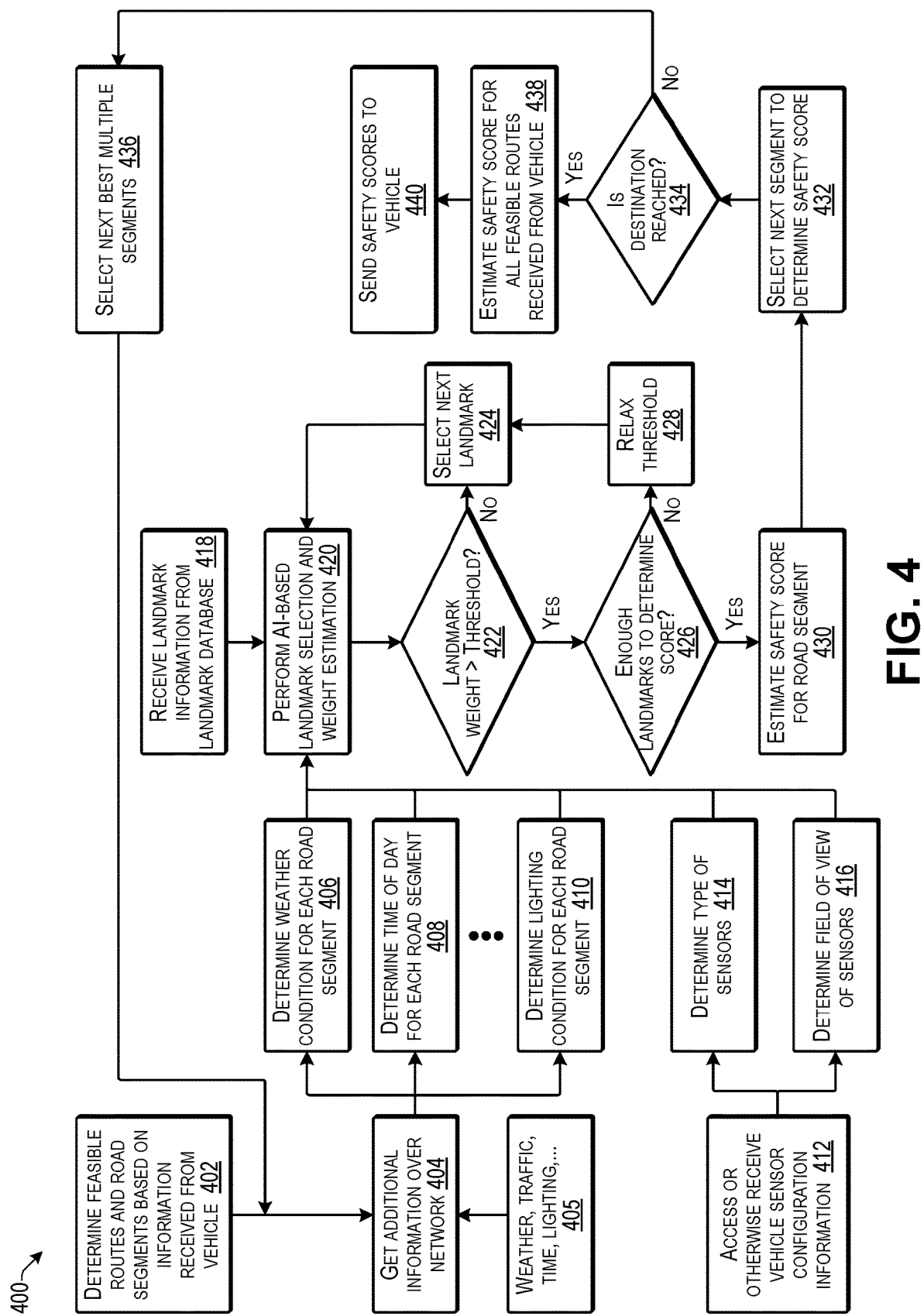
FIG. 4 is a flow diagram illustrating an example process for determining a safety score according to some implementations.

FIG. 4 is a flow diagram illustrating an example process 400 for determining a safety score according to some implementations. In some examples, the process 400 may be executed by the system 100 discussed above. For example, the process 400 may be executed by the service computing device(s) 108 by executing the navigation information program 146 in some examples. In addition, in some cases, the process 400 may correspond in part to blocks 212-230 of the process 200 of FIG. 2 discussed above.

At 402, the service computing device 108 may determine feasible routes for a trip and may determine multiple feasible road segments based on the feasible routes. For instance, the service computing device 108 receives source and destination information from the vehicle computing device 104, such as based on execution of the route selection program 126 by the vehicle computing device 104. After receiving the source and destination locations from the vehicle computing device 104, the service computing device 108 may execute the navigation information program 146 to determine all possible feasible routes between the source location and the destination location. The navigation information program 146 may be executed on the service computing device 108 to determine available routes to the destination and to create road segments for each route. Typically, there may be a plurality of separate or branched routes available between the source location and the destination location. When there are a large number of feasible routes, the service computing device 108 may narrow down the number of feasible routes to a smaller number based on various criteria such as a distance difference threshold or time difference threshold based on comparison of each route with the shortest route, or the like. Multiple feasible segments that originate from the source location may be selected for analysis, as discussed above with respect to FIG. 3.

At 404, the service computing device 108 may get additional information related to the routes and road segments over the network(s) 106. For example, the service computing device may connect over the one or more networks 106 to a web server or other information source computing device 110 to obtain additional information about local conditions related to the route and road segments determined for the vehicle 102. The service computing device 108 may execute the navigation information program 146 to communicate with third party cloud services and infrastructure or other information source computing devices 110 to gather information related to weather (such as rain, fog, snow, clear weather etc.), time of day, lighting conditions, traffic conditions, traffic rules, construction, local events such as street parties, festivals, sporting events, or the like, along the road segments. For example, as indicated at 405, the service computing device 108 may receive additional information such as weather conditions, traffic conditions, time information, lighting conditions, and so forth, e.g., as listed above.

At 406, the service computing device 108 may determine, based on the additional information received over the network(s) 106, the weather condition for each road segment during the time at which the vehicle would be expected to traverse each road segment.

At 408, the service computing device 108 may determine, based on the additional information received over the network(s) 106, the time of day during which the vehicle would be expected to traverse each road segment.

At 410, the service computing device 108 may determine, based on the additional information received over the network(s) 106, the lighting condition for each road segment during the time at which the vehicle would be expected to traverse each road segment. In addition, while three factors, namely weather, time and lighting are discussed in this example, other factors that may be used, such as traffic, local events taking place, construction, or the like, as listed above, or as will be apparent to those of skill in the art having the benefit of the disclosure herein.

At 412, the service computing device 108 may access or otherwise receive vehicle sensor configuration information for the vehicle 102. As mentioned above, in some examples, the vehicle computing device 104 may send the sensor configuration information to the service computing device 108. In other examples, the service computing device 108 may maintain a vehicle database 156, and may access the sensor configuration information in the vehicle database 156 if the service computing device 108 has previously received the sensor configuration information from the vehicle 102. In some examples, the sensor configuration of the vehicle 102 may include information such as sensor types on the vehicle 102 and their corresponding locations on the vehicle 102, field of view, resolution, sampling rate, and so forth.

At 414, the service computing device may determine the type of sensors onboard the vehicle 102 based on the received vehicle sensor configuration information.

At 416, the service computing device 108 may determine the field of view of each of the sensors included in the vehicle sensor configuration information for the vehicle 102.

At 418, the service computing device 108 may receive landmark information from the landmark database 148. For example, the service computing device 108 may access the landmark database 148 to obtain information about landmarks corresponding to the route and road segments determined for the vehicle 102.

At 420, the service computing device 108 may perform an AI based landmark selection and weight estimation. For example, the service computing device 108 may execute the navigation information program 146 to select landmarks from the landmark database 148 and determine a corresponding weight for each selected landmark along each road segment depending, at least in part, on the factors mentioned above. The corresponding weights for all the landmarks along each road segment may be used to determine the safety score of the road segment.

In some examples, the service computing device 108 may input the weather condition for the road segment, the time of day for the road segment, the lighting condition for the road segment, and so forth into the safety score MLM 150 (or other type of algorithm) as discussed above with respect to FIG. 1. In some cases, the safety score MLM 150 may be trained, tested and validated using the detection quality scores and other information in the landmark database 148, as described below.

The navigation information program 146 selects landmarks from the landmark database 148 along the selected road segment being analyzed, and provides a respective corresponding weight for each landmark depending on the conditions. The corresponding weight is calculated based on the sensor detection uncertainty for the selected landmark, as the sensor detection quality highly depends on the above-mentioned parameters. For example, weather, lighting, time of day, and so forth may be fuzzy parameters and do not have clearly defined boundaries. For instance, rain or snow might not be clearly classified as less, medium or heavy for sensor detection quality. Accordingly, implementations herein apply a threshold for sensor detection quality that may be estimated using machine learning techniques for various conditions. A few nonlimiting concrete examples are discussed below.

As one example, when roads are covered due to continuous light snowfall in daylight conditions, certain landmarks such as lane markers are not usable in this condition as their detection probability is very low. However, the landmarks such as buildings, poles and trees may still have a sufficient probability of detections and, therefore, these types of landmarks may be selected for a road segment to generate a safety score. On the other hand, when the weather conditions are good, i.e., no snow, the same lane markers may have higher probability of detection than that of trees and, therefore, the lane markers may be selected instead of the trees as landmarks to be used for the safety score calculations.

As another example, suppose that the time of day is night and the lighting condition along the road segment is dark, i.e., there are no streetlights or insufficient streetlights. Further, suppose that the vehicle is equipped with only camera sensors. When the road segment is dark, the camera sensor field of view may be restricted to only the areas where vehicle's headlights illuminate the road and surroundings. Accordingly, landmarks such as lane markers and traffic signs, such as stop signs, speed limit signs, street signs, and so forth, which have reflective properties and that fall within the field of view of the forward facing camera may have high detection probabilities and, therefore, these landmarks may be selected for the road segment when generating the safety score.

As still another example, suppose that the lighting condition is direct sunlight on the front of vehicle so that visibility for the forward-facing camera sensor is low. Further, suppose that the vehicle is equipped with radar in addition to the camera sensors. In this case, landmarks that have low detectability using radar might not be selected. Instead landmarks that have high detection probabilities with radar may be selected for the road segment when generating the safety score for the road segment.

As still another example, suppose that the time of day is night and lighting condition along the road segment is dark. Further, suppose that the vehicle is equipped with lidar and camera sensors. The lidar sensor typically works effectively in the dark and, therefore, landmarks such as buildings, poles, traffic signs, road curbs which can be effectively detected by lidar may be selected for the safety score estimation, as well as lane markers that may be predicted to be visible due to being illuminated by the vehicle's headlights.

As still another example, supposed that there are dense traffic conditions along a selected road segment. The detection of road surface features and traffic signs is difficult due to being blocked from detection by other vehicles. Accordingly, landmarks such as buildings and poles with areas which are typically higher in height than the vehicles on the road may be selected as landmarks for performing the safety score estimation for the road segment.

In some examples, the safety score MLM 150 may be configured by a using a maximum likelihood method. However, other techniques and/or other types of MLMs may be used, such based on using Bayesian probability for estimating quality of landmark using a Markov Chain rule or the like. In some examples, the navigation information program 146 may first create sample points along the selected road segment. Then at each sample point, the landmark quality may be evaluated for effectiveness for vehicle position estimation using above-discussed parameters, e.g., weather, lighting, traffic, time etc.

When formulating the landmark data association problem in terms of a maximum likelihood problem, the likelihood function for estimating vehicle pose using landmark detection may be formulated as a product of probability distribution. For example, in 1998, Olson and Matthies described maximum likelihood estimation techniques for performing rover localization in natural terrain by matching range maps. See, Olsen et al., Maximum Likelihood Rover Localization by Matching Range Maps, IEEE, 1998. In this paper, the authors defined a probability distribution only based on two-dimensional distance to the landmarks. On the other hand, implementations herein employ the maximum likelihood function to determine a probability distribution for each of the above parameters for each landmark to determine a probability of detection. Accordingly, the total probability of detection of an individual landmark may change with changes in parameters, as discussed in the examples above. Once the maximum likelihood for each sample point is estimated the landmarks which provide this maximum likelihood are extracted from global landmark database and their corresponding weights are estimated based on detection probabilities.

At 422, the service computing device 108 may determine whether the weight of a particular landmark is greater than a threshold weight. The landmarks with a weight greater than the threshold may be selected. If the number of landmarks to use for navigation is not insufficient for estimating the safety score, then the threshold may be relaxed, as discussed below, and more landmarks may be selected. If the landmark weight is greater than the threshold, the process may go to 426. If not, the process may go to 424.

At 424, the service computing device may select a next landmark for performing the AI based weight estimation for the landmarks based on the plurality of factors discussed at 406-410.

At 426, on the other hand, when the landmark weight exceeds the threshold, the service computing device 108 may determine whether there are enough landmarks that have exceeded the threshold to determine a safety score for the selected road segment. If not, the process goes to 428. If so, the process goes to 430.

At 428, when there are not enough landmarks with weights greater than a threshold to determine a safety score for the selected road segment, the service computing device 108 may relax the threshold and may go to 424 to select a next landmark for analysis using the relaxed threshold.

At 430, when enough landmarks for determining a safety score have been selected for the particular road segment, the service computing device 108 may estimate a safety score for the particular road segment. The safety score for each segment may be calculated using the corresponding weights of the selected landmarks. The safety score may be calculated as the weighted mean of the maximum likelihood for all sample points along the road segment and can be defined as follows:

$$S_r = \sum_{s_p=0}^{s_p=n} \frac{j * L(s_p)}{j}$$

where $S_r$ is the score of the road segment, $s_p$ is a sample point on the road segment, $L(s_p)$ is the maximum likelihood of that sample point, and j is the number of landmarks around each sample point based on the field of view of the sensors available on the vehicle.

At 432, the service computing device may select a next segment, if any, and may perform analysis determine a safety score for that segment. After the safety scores for all the feasible road segments are determined, the navigation information program 146 may select the next best segments to evaluate. The navigation information program 146 may recursively evaluate all the segments until the destination is reached.

At 434, the service computing device 108 may determine whether the destination is reached by the analyzed road segments for which a safety score was determined. If so, the process goes to 438. If not, the process goes to 436 at 436, when the destination is not reached such as due to not enough landmarks or the like, the service computing device 108 may select different multiple road segments or routes, such as the next best road segments or routes, and may return to 404 to analyze the newly selected road segments or routes.

At 438, the service computing device 108 may estimate a safety score for all the feasible routes determined for the vehicle computing device 104. For example, the normalized safety score for each route may be generated and from the road segment scores.

At 440, the service computing device 108 may send the safety scores and corresponding route information to the vehicle computing device 104. For example, the safety scores may be sent to the route prediction program on the vehicle computing device.

Figure 5:
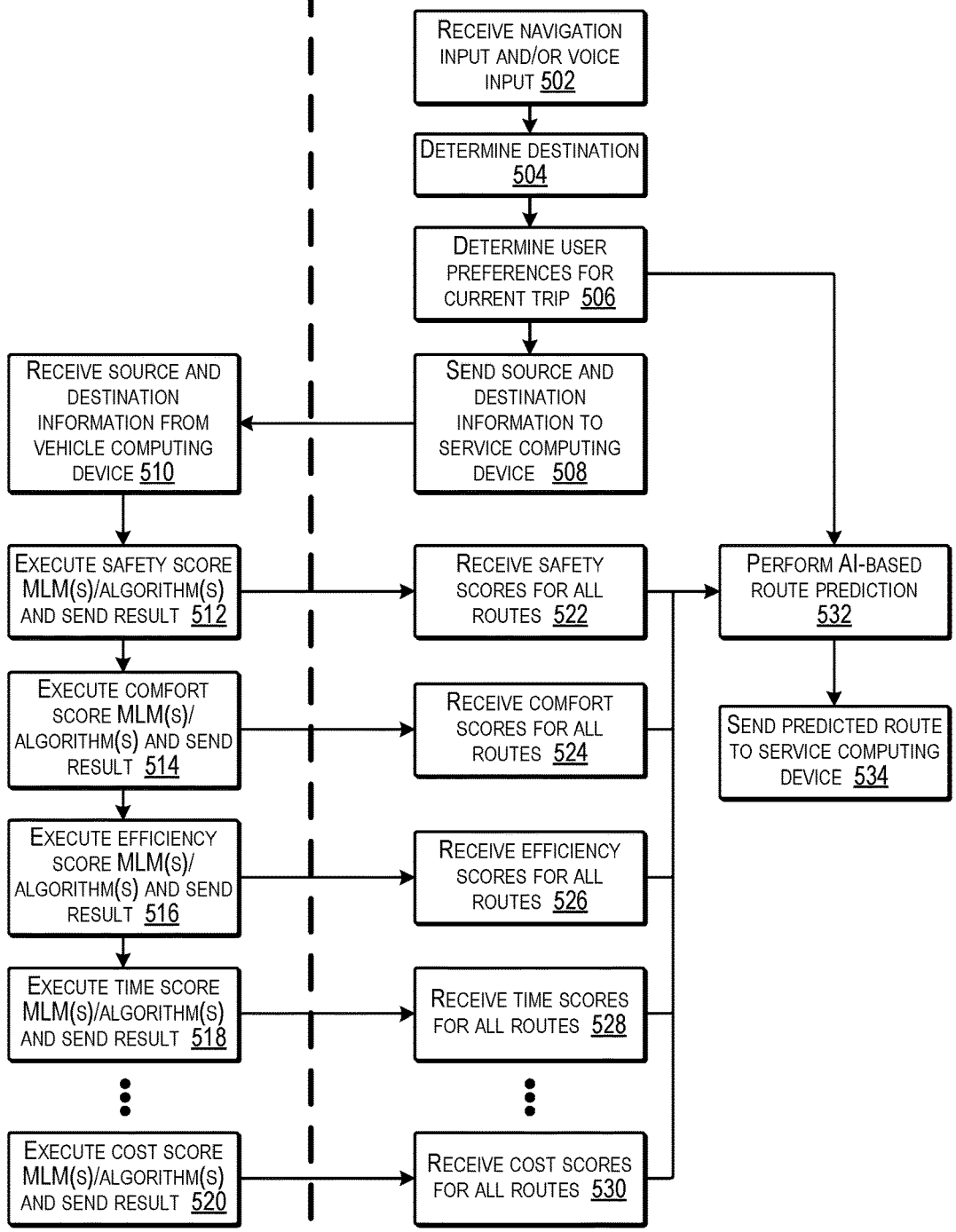
FIG. 5 is a flow diagram illustrating an example process for determining a predicted route according to some implementations.

FIG. 5 is a flow diagram illustrating an example process 500 for determining a predicted route according to some implementations. In some examples, the process 500 may be executed by the system 100 discussed above. For example, a portion of the process 500 may be executed by the vehicle computing devices 104, and another portion of the process 500 may be executed by the service computing devices 108, as indicated by the dashed line. Furthermore, while in this example, certain functions are being illustrated as being performed by one or the other of the computing devices 104 or 108, respectively, it will be readily apparent to those of skill in the art having the benefit of the disclosure herein that some of the functions may be performed by the other one of the computing devices 104 or 108. In addition, in some cases, the process 500 may correspond in part to blocks 202-210 and 224-232 of the process 200 of FIG. 2 discussed above.

At 502, the vehicle computing device 104 may receive navigation input and/or voice input from a vehicle occupant for determining a destination. For example, the route selection program may be executed to determine whether a destination has been provided by a user at the start of a trip. If the destination is not provided, the vehicle computing device 104 may query the user via a voice communication HMI, via a text prompt presented on a display screen, or the like.

At 504, the vehicle computing device 104 may determine the destination for the trip. For example, based on received inputs from the user and/or based on execution of a destination prediction algorithm, the vehicle computing device 104 may determine a destination for the trip. In some examples, a voice communication function of the HMI may provide suggestions to the user based on a predicted destination, inputs received from the user, and so forth, for determining and confirming the destination.

At 506, the vehicle computing device 104 may determine user preferences for the trip. For example, the vehicle computing device may refer to default user preferences, preloaded user preferences, or the vehicle computing device may query the user regarding the user preferences to identify the user preferences for the current trip. As several nonlimiting example, the user preferences may be categorized in a plurality of categories, such as safety, comfort, efficiency, time to destination, cost, and the like, which may be used during route selection, as discussed additionally below.

At 508, the vehicle computing device 104 may send the source and destination information to the service computing device 108. In addition, the vehicle computing device 104 may send sensor configuration information 136 to the service computing device 108 if the service computing device 108 does not already have this information in the vehicle database 156.

At 510, the service computing device 108 may receive the source and destination information sent by the vehicle computing device 104.

At 512, the service computing device 108 may execute the safety score MLM(s) and/or algorithms to determine a safety score for each selected route, e.g., as discussed above with respect to FIGS. 2-4.

At 514, the service computing device 108 may execute comfort score MLM(s) and/or algorithms to determine a comfort score for each selected route. For example, similar to the process discussed above with respect to FIGS. 2-4, the navigation information program 146 may be executed by the service computing device 108 to determine a comfort score for each road segment of each route. Examples of factors used for determining comfort of a vehicle occupant may include whether a road segment has a large number of "S" curves, whether the ground is level or wavy, whether a constant speed can be maintained, whether stop and go traffic will be encountered, or the like.

At 516, the service computing device 108 may execute efficiency score MLM(s) and/or algorithms to determine an efficiency score for each selected route. For example, similar to the process discussed above with respect to FIGS. 2-4, the navigation information program 146 may be executed by the service computing device 108 to determine an efficiency score for each road segment of each route. Examples of factors used for determining efficiency of a vehicle for a route may include the length of a road segment, the number of stops and starts that may be required on the road segment, whether the ground is level or hilly, whether a constant speed can be maintained, whether stop and go traffic will be encountered, or the like.

At 518, the service computing device 108 may execute time score MLM(s) and/or algorithms to determine a time score for each selected route. For example, similar to the process discussed above with respect to FIGS. 2-4, the navigation information program 146 may be executed by the service computing device 108 to determine a time score for each road segment of each route. Examples of factors used for determining a time for a vehicle to traverse a route may include the length of a road segment, the number of stops and starts that may be required on the road segment, whether a constant speed can be maintained, the speed limit on the road segment, whether stop and go traffic will be encountered, or the like.

At 520, the service computing device 108 may execute cost score MLM(s) and/or algorithms to determine a cost score for each selected route. For example, similar to the process discussed above with respect to FIGS. 2-4, the navigation information program 146 may be executed by the service computing device 108 to determine a cost score for each road segment of each route. Examples of factors used for determining the cost for a vehicle for a route may include whether any tolls will be required, and the amount of any tolls, the amount of fuel expected to be used to traverse the route, or the like. Furthermore, while five possible types of scores are described in this example, others types of scores may be used in addition to, or as an alternative to, the scores described in this example as will be apparent to those of skill in the art having the benefit of the disclosure herein.

At 522, the vehicle computing device 104 receives the safety scores for all routes from the service computing device 108.

At 524, the vehicle computing device 104 receives the comfort scores for all routes from the service computing device 108.

At 526, the vehicle computing device 104 receives the efficiency scores for all routes from the service computing device 108.

At 528, the vehicle computing device 104 receives the time scores for all routes from the service computing device 108.

At 530, the vehicle computing device 104 receives the cost scores for all routes from the service computing device 108. Furthermore, while five possible types of scores are described in this example, others types of scores may be used in addition to, or as an alternative to, the scores described in this example as will be apparent to those of skill in the art having the benefit of the disclosure herein.

At 532, the vehicle computing device 104 may execute the route selection program 126 to determine a predicted route based on the safety scores and the other scores received from the service computing device 108. For example, the safety scores received from the service computing device 108 may be used for route prediction in conjunction with the various other scores for the various other factors, such as time, cost, efficiency, comfort, etc., for all routes. The route selection program 126 may first weight the received scores for the various factors based on the user preferences determined at 506. For example, the route selection program 126 receives the user preference information determined at 506 and also receives the respective scores for each route for safety based on landmark selection, time to travel the route, cost of traveling on the route, efficiency of the route, etc., determined by the service computing device 108. All these factors are weighted based on the user preferences. For example, if the user preference is for safety, the safety scores may be weighted higher than the other parameters for each route. On the other hand, if the user preference is to get the destination as soon as possible, the time score may be weighted higher. Based on the user preferences, the predicted route may not necessarily be the safest route to the destination location.

In some examples, the route selection program 126 employs a route prediction MLM 130 or other algorithm that evaluates the weighted scores against pre-determined thresholds based at least in part on a cost function as follows:

$$J = \Sigma w_i * C_{ij}$$

where $w_i$ is the user preference weight, $C_{ij}$ is the score or cost of the parameter, i is the parameter such as safety, time, cost, efficiency, comfort, etc. and j is the route option. The route J having the highest ranked score may be selected as the predicted route.

At 534, after a predicted route is selected by execution of the route selection program 126, the vehicle computing device 104 may send the route information for the selected route to the service computing device 108 for performing the localization processing for the selected route.

Figure 6:
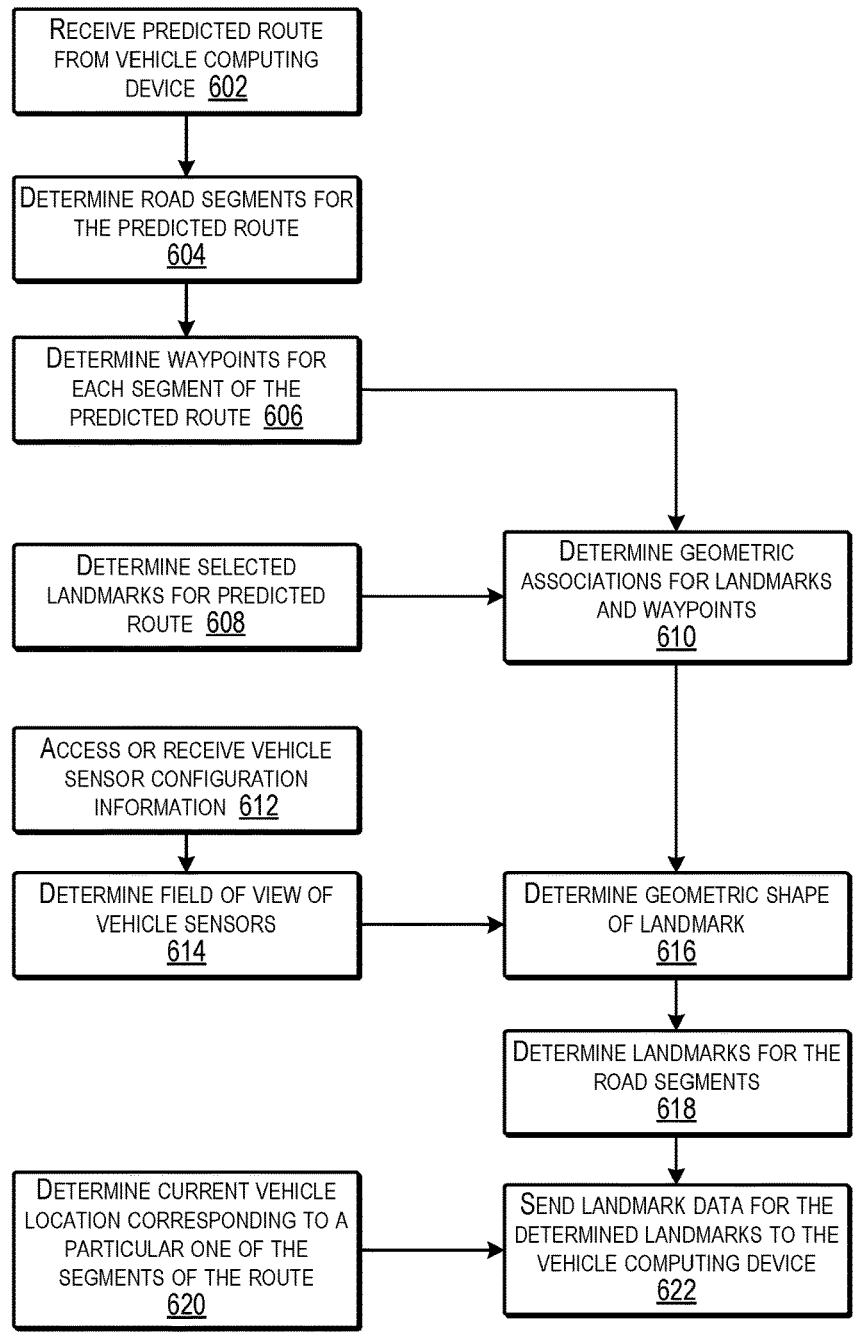
FIG. 6 is a flow diagram illustrating an example process for determining landmark data for localization according to some implementations.

FIG. 6 is a flow diagram illustrating an example process 600 for determining landmark data for localization according to some implementations. In some examples, the process 600 may be executed by the system 100 discussed above. For example, the process 600 may be executed by the service computing device(s) 108 by executing the navigation information program 146 in some examples. In addition, in some cases, the process 600 may correspond in part to block 234 of the process 200 of FIG. 2 discussed above.

At 602, the service computing device 108 may receive the predicted route from the vehicle computing device 104. The service computing device 108 may also receive a current location of the vehicle 102, which may correspond to a portion of the predicted route.

At 604, the service computing device 108 may determine a current road segment for the predicted route at which the vehicle is currently located. For example, the service computing device 108 may execute the navigation information program 146 to determine to the road segment that the vehicle is on currently based on the route information and the current vehicle information. The road segments may be determined based on the techniques discussed above.

At 606, the service computing device 108 may determine waypoints for the road segment of the predicted route. For example, the waypoints may be positions along the road segment at which the vehicle is able to localize itself identifying corresponding landmarks.

At 608, the service computing device may determine selected landmarks for the predicted route. For example, based on the waypoint information, the localization MLM or other algorithm may be executed to extracts the landmarks already determined using the safety score MLM 150 discussed above. For example, the best landmarks for localization on the road segment for the current conditions and the vehicle sensor configuration will have already been determined during calculation of the safety scores for each road segment, as discussed above.

At 610, the service computing device 108 may determine geometric associations for landmarks and waypoints for each segment of the predicted route.

At 612, the service computing device 108 may access or otherwise receive vehicle sensor configuration information.

At 614, the service computing device 108 may determine the field of view of the vehicle sensors for the particular vehicle.

At 616, the service computing device 108 may determine the geometric shape of the selected landmarks. For example, the geometric shape of a landmark to be detected for localization may be estimated based on the field of view of the sensor(s) and the sensor configuration of the vehicle for each waypoint. The landmark data for a plurality of landmarks may be made ready for localization. For example, suppose that the vehicle is equipped with stereo camera sensor in front that has a horizontal FOV of 50 degree and vertical FOV of 20 degree. Based on this FOV, the landmark data for each waypoint may be generated in such a way that the area of the landmark that is expected to be visible in the FOV at the waypoint may be set for localization. Examples setting an expected FOV for localization are discussed below with respect to FIGS. 7A and 7B.

At 618, the service computing device 108 may determine landmarks for at least the current road segment of the predicted route.

At 620, the service computing device 108 may determine the current vehicle location corresponding to the particular road segment of the predicted route to send the landmark data to the vehicle computing device 104.

At 622, the service computing device 108 may send the landmark data to the localization program 128 on the vehicle computing device 104. The localization program 128 may determine the current location of the vehicle based on using the received landmark data for matching with the landmarks at the nearest waypoint to the current location of the vehicle.

Figure 7A:
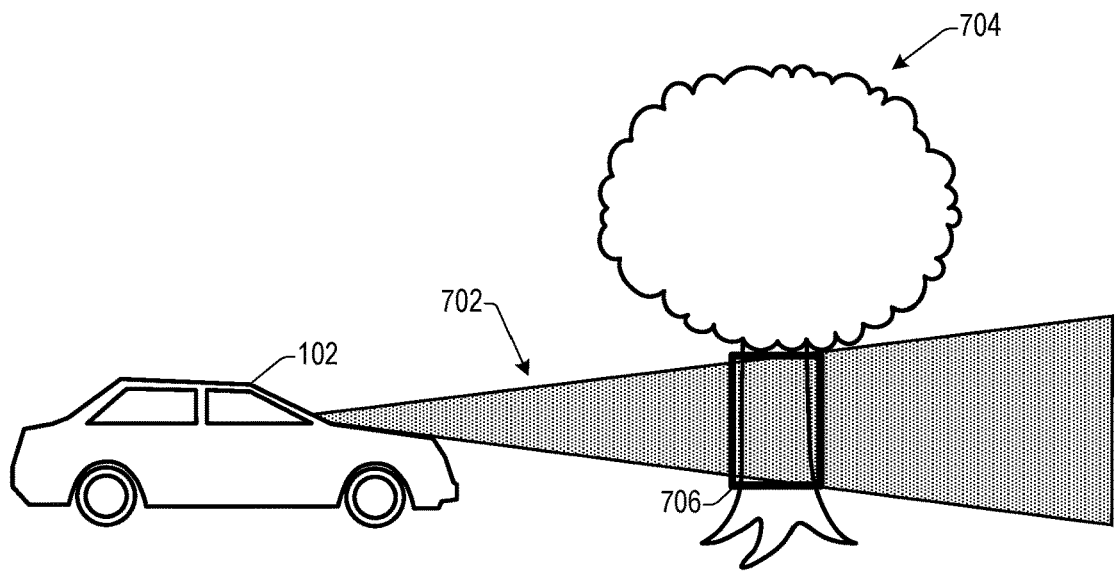
FIGS. 7A and 7B illustrate examples of landmark shape extraction according to some implementations.
Figure 7B:
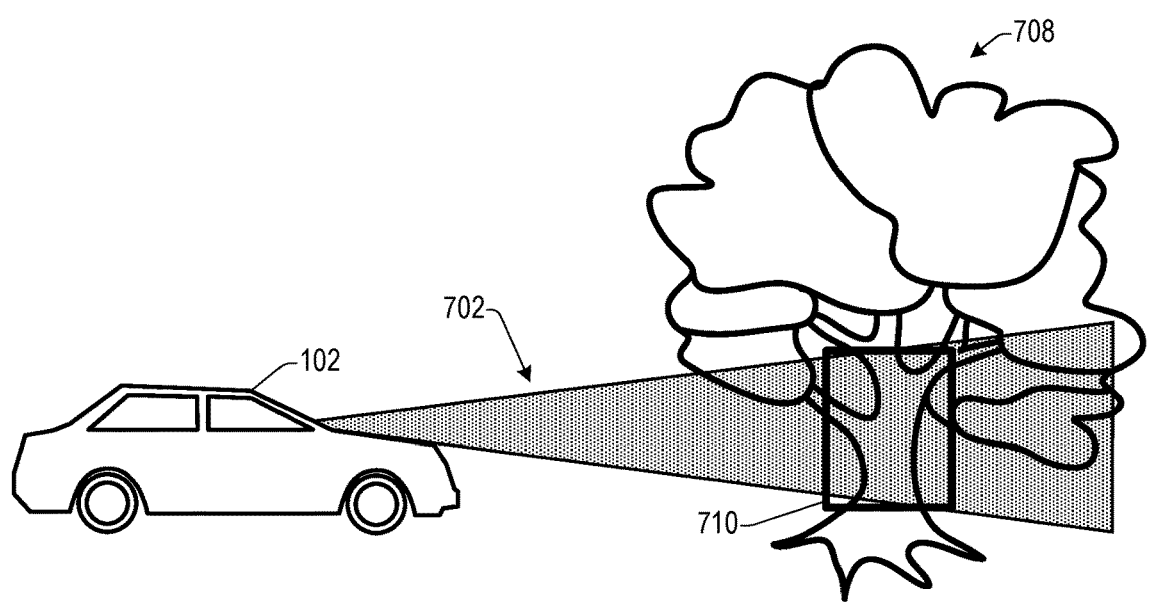

FIGS. 7A and 7B illustrate examples of landmark selection based on shape extraction according to some implementations. As mentioned above, the geometric shape of a landmark to be detected for localization may be estimated based on the sensor configuration of the vehicle and the FOV of the sensors. Based on this technique, the area of the landmark that is expected to be visible in the FOV at the waypoint may be set for localization.

As illustrated in FIG. 7A, supposed that the vehicle 102 is equipped with a forward facing stereo camera sensor with horizontal FOV of 50 degree and vertical FOV of 20 degree. Accordingly, the landmark data for each way point may be generated in so that the area of a landmark 704, such as a tree, which is visible in the FOV at the waypoint may be set for localization as shown in FIG. 7A, which is a rectangle 706 in this example. Further, as illustrated in FIG. 7B, for a different landmark 708, the geometric shape may be different, i.e., a different shape and size rectangle 710. Further, while rectangles are shown in these example, in other examples, other geometric shapes may be more suitable, depending on the shape and size of the landmark.

Figure 8:
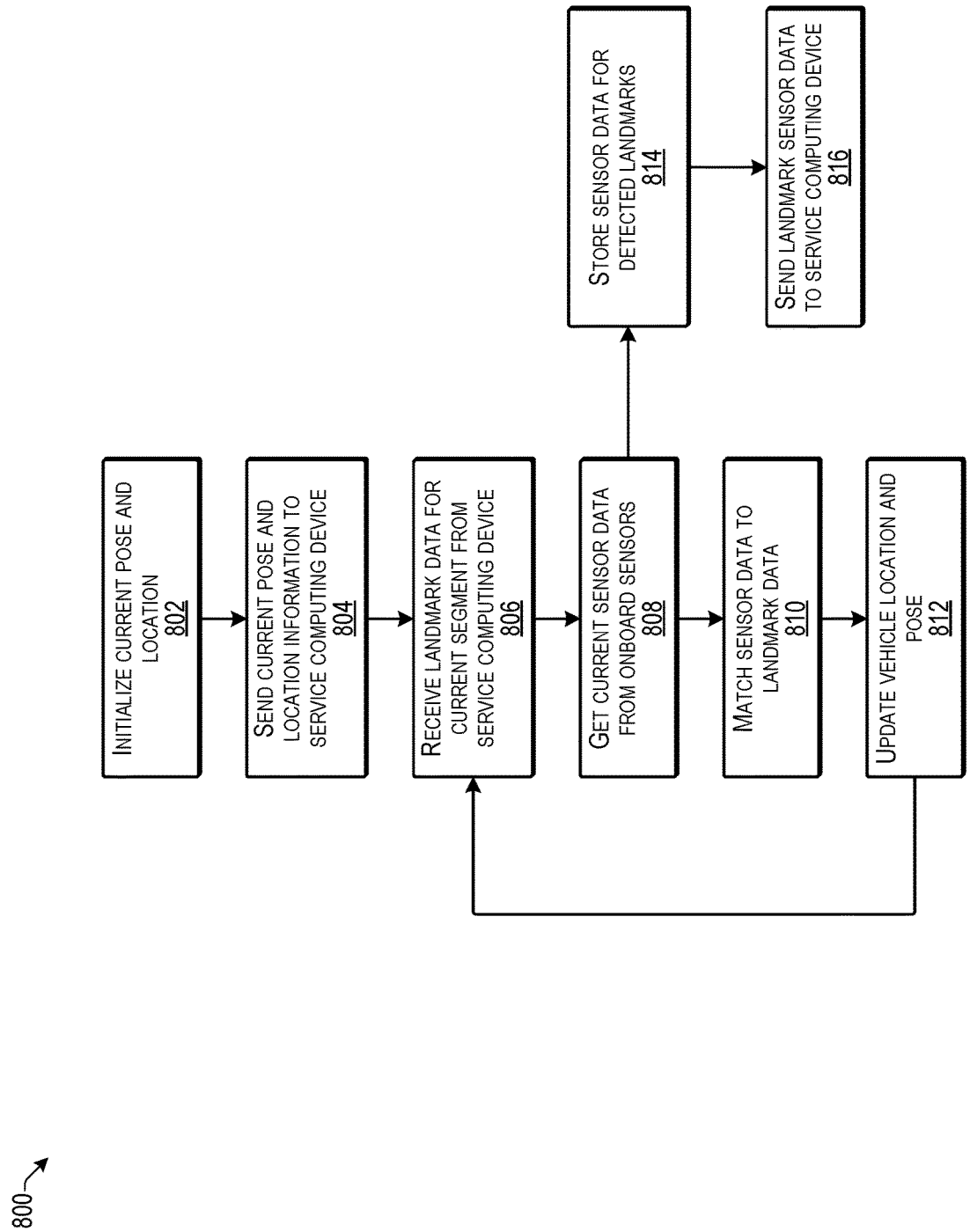
FIG. 8 is a flow diagram illustrating an example process for performing localization according to some implementations.

FIG. 8 is a flow diagram illustrating an example process 800 for performing localization according to some implementations. In some examples, the process 800 may be executed by the vehicle computing device(s) 104 by executing the localization program 128 in some examples. In addition, in some cases, the process 800 may correspond in part to blocks 236-238 of the process 200 of FIG. 2 discussed above.

At 802, the vehicle computing device 104 may execute the localization program 128 to initialize a current pose and general location for the vehicle 102. For instance, the pose may be determined at least in part based on compass information and the general location may be determined based at least in part on GPS information or the like.

At 804, the vehicle computing device 104 may send the current pose and location information to the service computing device 108.

At 806, the vehicle computing device 104 may receive landmark data for a current road segment from the service computing device 108. For example, as discussed above with respect to FIG. 6, in response to sending the current location of the vehicle to the service computing device 108, the service computing device 108 may send landmark data for enabling localization for the current segment to the vehicle computing device 104.

At 808, the vehicle computing device 104 may receive, from the onboard sensors 112, current sensor data for the surroundings of the vehicle 102 at the vehicle's current location. As one example, based on the landmark data received from the service computing device, the localization program 128 may communicate with the vehicle onboard sensors 112. The localization program 128 may identify the quadrants of the vehicle where the landmark data indicates that the landmarks are located, and may activate sensors or otherwise receive data from the sensors that have a FOV corresponding to the identified quadrants. Thus, in some examples, the localization program 128 may receive or process current sensor data only from the sensors corresponding to the identified quadrants while ignoring not receiving or not processing data from sensors corresponding to quadrants that do not contain landmarks.

At 810, the vehicle computing device 104 may match the received sensor data to the landmark data received from the service computing device 108. In some examples, after the current sensor data is received by the localization program 128, the localization program may associate the detected landmarks with the landmarks corresponding to a navigation map, such as an HD map, or the like. Some implementations herein may employ iterative closest point (ICP) matching for associating the landmark data for each vehicle quadrant and may then estimate the weighted mean for frame to frame transformation. Other techniques such as normal distributions transform (NDT) matching, machine learning, or the like, may also be used for data association of landmarks.

In some examples, the localization program 128 may determine the vehicle position using a Markov chain rule and extended Kalman filter (EKF). In addition, techniques such as visual odometry can also be used in combination with the above discussed techniques to perform localization. Numerous other variations will be apparent to those of skill in the art having the benefit of the disclosure herein.

Furthermore, the computation time may be considerably reduced by only processing the sensor data received from certain active quadrants, which, for instance, reduces the ICP computation load. Accordingly, implementations herein are able to achieve high localization accuracy by selecting the landmarks most likely to be recognizable for each waypoint based on the sensor configuration and the external conditions as discussed above.

At 812, as discussed above, the vehicle computing device 104 may update the vehicle location and pose based on matching the sensor data with the landmark data and based on matching the landmark data with a navigation map such as an HD map or the like.

At 814, the vehicle computing device may store the sensor data for the detected landmarks. For example, the vehicle computing device may include an onboard storage device or the like for storing the sensor data for the matched landmarks. The localization program 128 may store landmark data for each landmark detected using the received onboard sensor data and may store the landmark data to subsequently upload the data to the service computing device, such as at the end of each trip. The localization program 128 may further calculate a detection score for each landmark which may represent the matching quality for the landmark. As one example, the detection score may be determined based on a reciprocal of average Euclidian distances between sensor detected features and landmark features after matching if the landmark already exists in the landmark database 148. For instance, a lower residual error in matching may signify a better matching quality for a respective landmark. The detection score may also depend at least in part on the vehicle sensor configuration active at the time of detection and various external factors.

At 816, the vehicle computing device 104 may send the stored landmark sensor data to the service computing device 108 to be used for updating the landmark database. In some examples, the stored landmark sensor data is sent following completion of the trip or at any other suitable time, and may be sent singly, in batches, or the like.

Figure 9:
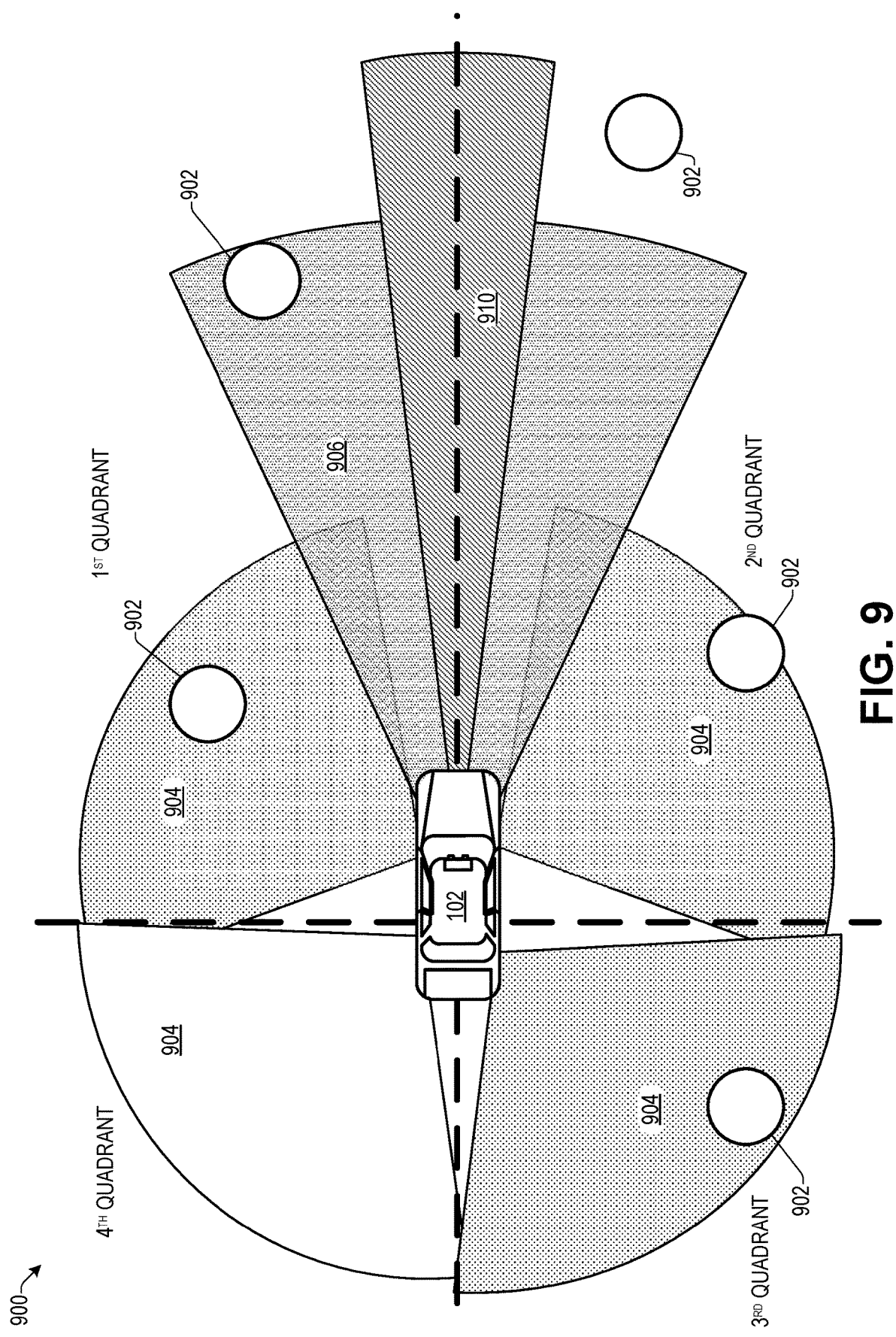
FIG. 9 illustrates an example of sensing landmarks using active sensors corresponding to where the landmarks are expected to be according to some implementations.

FIG. 9 illustrates an example 900 of sensing landmarks using active sensors corresponding to where the landmarks are expected to be according to some implementations. For example, based on the landmark data for localization received from the service computing device 108, the localization program 128 may communicate with the vehicle onboard sensors 112. For instance, based on the landmark data, the localization program 128 may identify which quadrants of the vehicle 102 at which the landmark data indicates landmarks 902 are located. In some examples, the sensors in a quadrant in which there will be no landmarks to detect may be deactivated. In other examples, rather than deactivating the sensors, the data from the sensors corresponding to the quadrants without landmarks may be ignored or otherwise not processed. Accordingly, the localization program 128 may receive and/or process only current sensor data from the active quadrants. For instance, in the example of FIG. 9, the first second and third quadrants are active for landmark detection, while the fourth quadrant may be treated as inactive.

The example of FIG. 9 illustrates a possible configuration of sensor coverage by the onboard sensors 112 for the vehicle 102 according to some implementations. The vehicle 102 may be equipped with a wide range of sensors to detect and recognize landmarks, as well as to detect obstacles, other vehicles, and so forth. Commonly used sensors may include mono cameras, stereo cameras, infrared cameras, radar, LIDAR, lasers, ultrasonic sensors, and so forth. For any specific driver assistance system application or any specific level of driving automation, the sensors may be selected based on the advantages and disadvantages of the sensor type, which may include detection range, type of detection ability, power requirements, cost, amount of data generated, and the like. Each sensor type may have advantages and disadvantages, and thus, different types of sensors may be combined in use on the vehicle 102 for improving accuracy in various weather or other types of conditions.

As one example, a camera (mono/stereo) might not perform well in the dark or during inclement weather conditions, and the detection range may be comparatively low compared to similarly priced radar sensors. However, a radar sensor might not be able to detect a human and may have difficulty in detecting lane markers. On the other hand, a radar sensor may be a good candidate for long-range detection of other vehicles, as compared to other sensor types. As another example, an infrared camera may perform well under night conditions, but may also suffer from poor long-distance-detection capability. Additionally, a LIDAR sensor may perform well under night and day conditions, but may be costly and may generate huge amounts of data that may require a high capacity processor to process the data in real time. Further, while ultrasonic sensors are lower in cost than some other types of sensors, the detection range of ultrasonic sensors may be 10 meters or less, which may limit their usefulness. In view of the foregoing, multiple different sensor types are typically employed for ADAS/AD vehicles to continuously monitor the vehicle surroundings.

In the example of FIG. 9, the vehicle 102 is equipped with multiple different sensors for 360-degree monitoring of the vehicle surroundings. In this example, the vehicle 102 may be equipped with four surround mono cameras and/or radar sensors, each a having a respective approximate detection area 904. The vehicle 102 may also be equipped with a forward-facing mono or stereo camera having an approximate detection area 906 in front of the vehicle 102. Additionally, the vehicle 102 may be equipped with a long range radar sensor having an approximate detection area 910 in front of the ADAS/AD vehicle 120. In some cases, a LIDAR sensor may be used in place of, or in addition to, one or more of the stereo camera, the long-range radar, or others of the above-discussed sensors. Further, while several example sensor configurations are discussed with respect to FIG. 9, numerous other sensor types, locations, and configurations will be apparent to those of skill in the art having the benefit of the disclosure herein. Accordingly, implementations herein are not limited to any particular sensor types, locations, or configurations.

Figure 10:
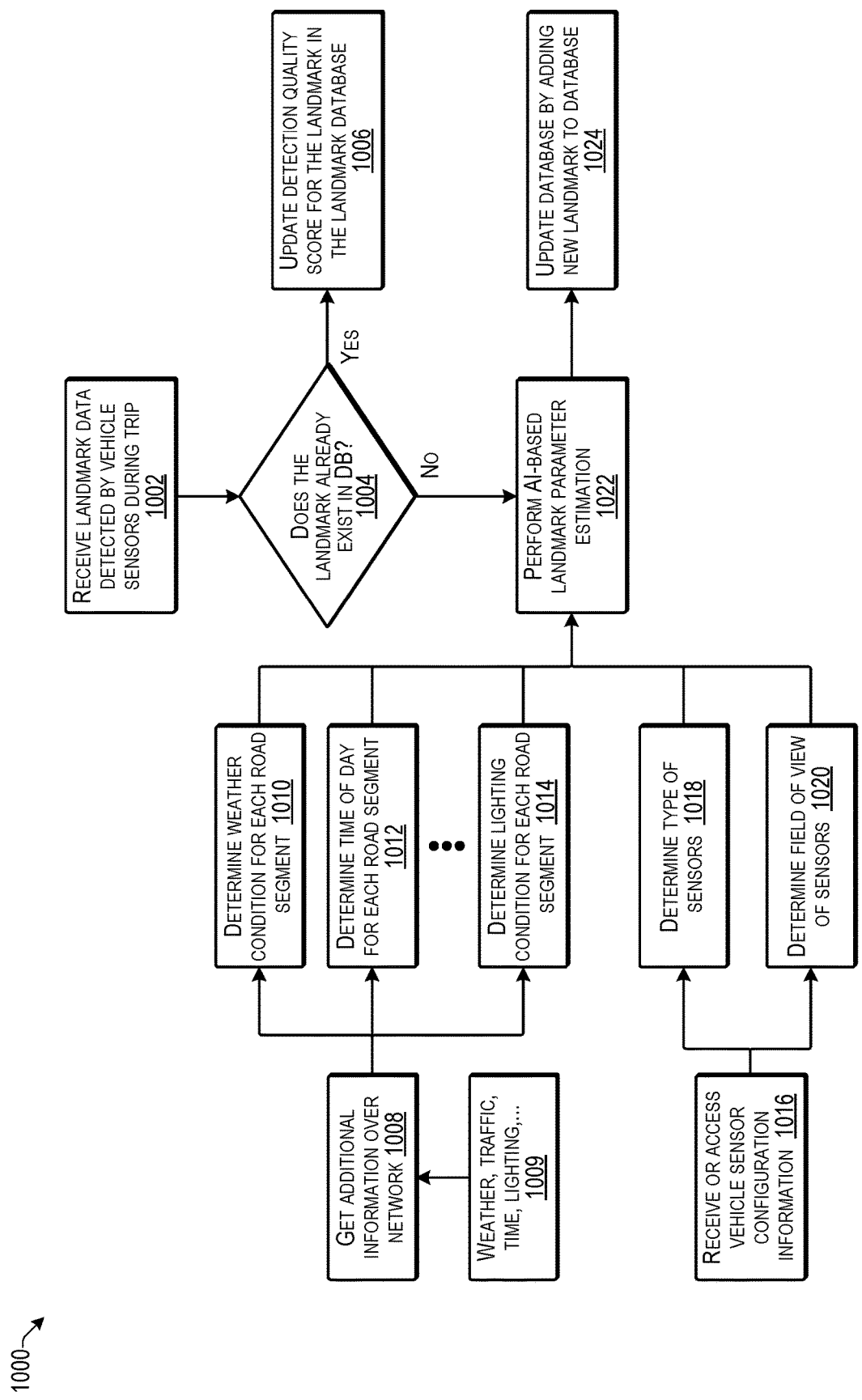
FIG. 10 is a flow diagram illustrating an example process for updating the landmark database according to some implementations.

FIG. 10 is a flow diagram illustrating an example process 1000 for updating the landmark database according to some implementations. In some examples, the process 1000 may be executed by the system 100 discussed above. For example, the process 1000 may be executed by the service computing device(s) 108 by executing the navigation information program 146 and the landmark update MLMs 154 or other algorithms in some examples. In addition, in some cases, the process 1000 may correspond in part to block 240 of the process 200 of FIG. 2 discussed above.

As one example, when the destination location has been reached, the localization program 128 may determine that the vehicle has reached the end of the trip and may upload the stored landmark data from the vehicle 102 to the service computing device 108. The navigation information program 146 may receive the landmark information from the vehicle computing device 104 and may employ the landmark update MLM 154 or other suitable algorithm for updating the landmark database 148 based on the landmark data received from the vehicle 102.

At 1002, the service computing device 108 may receive the landmark data detected by the vehicle sensors 112 during the trip.

At 1004, for each landmark about which data is received, the service computing device 108 may determine whether the landmark already exists in the landmark database 148. If so, the process goes to 1006. If not, the process goes to 1022.

At 1006, when the landmark already exists in the landmark database 148, the service computing device 108 may update a detection quality score for the landmark in the landmark database 148 for the particular landmark.

If the landmark does not already exist in the landmark database, a detection quality score for the landmark may be determined based on the external conditions and vehicle sensor configuration, such as by using maximum likelihood method discussed above, e.g., with respect to FIG. 4. Furthermore, the landmark attributes may be extracted by the landmark update MLM 154 or other suitable algorithm, and the details of the landmark data for the new landmark may be added to the landmark database 148.

At 1008, the service computing device 108 may get additional information related to the trip over the network(s) 106. For example, the service computing device may connect over the one or more networks 106 to a web server or other information source computing device 110 to obtain additional information about local conditions related to the trip. For example, as indicated at 1009, the service computing device 108 may receive additional information such as weather conditions, traffic conditions, time information, lighting conditions, and so forth, e.g., as listed above.

At 1010, the service computing device 108 may determine, based on the additional information received over the network(s) 106, the weather condition for a road segment during the trip corresponding to the new landmark.

At 1012, the service computing device 108 may determine, based on the additional information received over the network(s) 106, the time of day during which the vehicle traversed the road segment corresponding to the new landmark.

At 1014, the service computing device 108 may determine, based on the additional information received over the network(s) 106, the lighting condition for the road segment corresponding to the new landmark. In addition, while three factors, namely weather, time and lighting are discussed in this example, various other factors may be used, such as traffic, local events taking place, construction, or the like, as listed above, or as will be apparent to those of skill in the art having the benefit of the disclosure herein.

At 1016, the service computing device 108 may access or otherwise receive vehicle sensor configuration information for the vehicle 102. As mentioned above, in some examples, the vehicle computing device 104 may send the sensor configuration information to the service computing device 108. In other examples, the service computing device 108 may maintain a vehicle database 156, and may access the sensor configuration information in the vehicle database 156 if the service computing device 108 has previously received the sensor configuration information from the vehicle 102. In some examples, the sensor configuration of the vehicle 102 may include information such as sensor types onboard the vehicle 102 and their corresponding locations on the vehicle 102, field of view, resolution, sampling rate, and so forth.

At 1018, the service computing device may determine the type of sensors onboard the vehicle 102 based on the received vehicle sensor configuration information.

At 1020, the service computing device 108 may determine the field of view of each of the sensors included in the vehicle sensor configuration information for the vehicle 102.

At 1022, the service computing device 108 may perform AI based landmark parameter estimation. For example, the service computing device 108 may determine a detection quality score for the new landmark based on the external conditions and vehicle sensor configuration, such as by using the maximum likelihood method discussed above, e.g., with respect to FIG. 4. Furthermore, the landmark attributes may be extracted by the landmark update MLM 154 or other suitable algorithm.

At 1024, the service computing device 108 may update the landmark database by adding new landmark and the details of the new landmark to the database 148.

FIG. 11 illustrates an example data structure 1100 of landmark information stored in the landmark database 148 according to some implementations. In some cases, the landmark database 148 may include information about various types of landmarks such as buildings, trees, road surface features, curbs, poles, traffic signs, structures etc. Each landmark added to the database 148 may include attributes including but not limited to type of landmark, location of landmark, geometric definition, material properties (if applicable), features (such as edge information, point cloud data, etc.), and so forth. In addition, each landmark may include a detection quality score that may be continually updated based on detectability and various types of conditions.

In the illustrated example, the data structure 1100 includes attributes 1102, description 1104, and detection quality score 1106. The description 1104 indicates that the landmark is a stop line at an intersection with a detection quality score 1106 of 0.0314. Other attributes 1102 of the landmark that may be included in the database include the geometry and location of the landmark.

FIG. 12 illustrates an example data structure 1200 of landmark information stored in the landmark database according to some implementations. In this example, the landmark is a standard lane on a road having a left lane border and a right lane border as indicated by the description 1104. Furthermore, in this example, the data structure 1200 for the landmark includes two detection quality scores 1106, i.e. a detection score of 0.0023 for the left lane marker and a detection score of 0.0453 for the right lane marker. Additional attributes 1102 included for this landmark may include curvature, lane border type, locations of the left and right lane borders, material, and color.

FIG. 13 illustrates an example data structure 1300 of landmark information stored in the landmark database according to some implementations. In this example, the landmark is a wall of a building as indicated by the description 1104. In this example, the detection quality score 1106 for the wall is 0.0013. Additional attributes for the landmark may include the wall geometry, wall features, wall color and wall location.

FIG. 14 illustrates an example data structure 1400 of landmark information stored in the landmark database according to some implementations. In this example, the landmark is a stop sign having a detection quality score of 0.23, indicating that the stop sign is highly detectable in many types of conditions. Additional attributes for the landmark include the color, shape, heading, geometry and location. Furthermore, while several example landmarks have been described herein, numerous other types of landmarks will be apparent to those of skill in the art having the benefit of the disclosure herein.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
one or more processors; and
one or more non-transitory computer-readable media including executable instructions, which, when executed by the one or more processors, configure the one or more processors to perform operations comprising:
receiving, by the one or more processors, from a vehicle computing device of a vehicle, a source location and a destination location;
determining, by the one or more processors, a plurality of candidate routes between the source location and the destination location;
determining, by the one or more processors, a plurality of landmarks along each candidate route between the source location and the destination location;
determining, by the one or more processors, current conditions corresponding to the plurality of landmarks along each candidate route, the current conditions including at least one of a weather condition, a lighting condition, a time condition, or a traffic condition;
receiving, by the one or more processors, vehicle sensor configuration information for a plurality of sensors onboard the vehicle;
determining, by the one or more processors, for individual landmarks of the plurality of landmarks along each candidate route, and based on the sensor configuration information and the current conditions, a probability of detection of the individual landmarks by multiple ones of the sensors of the plurality of sensors onboard the vehicle;
determining, by the one or more processors, respective scores for individual candidate routes of the plurality of candidate routes based on the probability of detection of the individual landmarks of the plurality of landmarks along each candidate route by multiple ones of the sensors of the plurality of sensors onboard the vehicle;
sending, by the one or more processors, to the vehicle computing device, and based at least on the respective scores determined for the individual candidate routes, information related to at least one candidate route that at least in part causes the vehicle computing device to select one of the at least one candidate route as a selected route between the source location and the destination location;
receiving, by the one or more processors, the selected route from the vehicle computing device;
determining, by the one or more processors, geometric associations for landmarks along the selected route; and
sending, by the one or more processors, the geometric associations for the landmarks to the vehicle computing device, the sending the geometric associations for the landmarks to the vehicle computing device causing at least in part the vehicle computing device to select one or more of the sensors of the plurality of sensors onboard the vehicle and utilize the selected one or more sensors for locating the landmarks along the selected route based at least on the geometric associations, the vehicle computing device determining a location of the vehicle for performing navigation based at least in part on locating the landmarks along the selected route via the selected one or more sensors.

2. The system as recited in claim 1, the operations further comprising:
segmenting each candidate route of the plurality of candidate routes into a plurality of road segments; and
determining the current conditions by determining the current conditions for respective road segments of the plurality of road segments for each candidate route.

3. The system as recited in claim 1, the operation of determining respective scores for the individual candidate routes of the plurality of candidate routes further comprising:
determining respective safety scores for the individual candidate routes based at least on the probability of detection of the individual landmarks along each of the individual candidate routes; and
sending the respective safety scores for one or more of the candidate routes to the vehicle computing device to cause in part, the vehicle computing device to determine the selected route between the source location and the destination location based in part on the respective safety scores for the one or more candidate routes.

4. The system as recited in claim 3, wherein, following locating the landmarks along the selected route based at least in part on the geometric associations, the vehicle computing device determines the location of the vehicle based in part on associating the located landmarks with corresponding landmarks on a navigation map.

5. The system as recited in claim 3, wherein determining the respective safety scores further comprises:
segmenting each candidate route of the plurality of candidate routes into a plurality of road segments;

determining the current conditions by determining the current conditions for respective road segments of the plurality of road segments for each candidate route;

determining weights for individual landmarks based at least on the current conditions for the respective road segments, the weights corresponding at least in part to the probability of detection of the individual landmarks;

determining a safety score for individual road segments based on the weights of the plurality of landmarks corresponding to the individual road segments; and determining the safety score for the at least one candidate route by aggregating respective safety scores of the individual road segments that comprise the at least one candidate route.

6. The system as recited in claim 1, wherein determining, based on the sensor configuration information and the one or more current conditions, the probability of detection of the individual landmarks by multiple ones of the sensors further comprises:

determining a type of the sensors onboard the vehicle and a field of view of the sensors onboard the vehicle, and determining a probability that multiple different types of the sensors are able to detect the individual landmark.

7. The system as recited in claim 1, the operations further comprising:

receiving, from the vehicle computing device, sensor data indicating the landmarks detected during traversal of the selected route; and updating an indication of the probability of detection of one or more of the landmarks in a landmark database based at least in part on the received sensor data.

8. A method comprising:

receiving, by one or more processors, from a vehicle computing device of a vehicle, location information including a source location and a destination location;

determining, by the one or more processors, a plurality of candidate routes between the source location and the destination location;

determining, by the one or more processors, based on the location information, a plurality of landmarks along each candidate route between the source location and the destination location;

determining, by the one or more processors, one or more current conditions corresponding to the plurality of landmarks along each candidate route;

receiving, by the one or more processors, sensor configuration information for a plurality of sensors onboard the vehicle;

determining, by the one or more processors, for individual landmarks of the plurality of landmarks along each candidate route, and based on the sensor configuration information and the one or more current conditions, a probability of detection of the individual landmarks by multiple ones of the sensors of the plurality of sensors onboard the vehicle;

determining, by the one or more processors, respective scores for individual candidate routes of the plurality of candidate routes based on the probability of detection of the individual landmarks of the plurality of landmarks along each candidate route by multiple ones of the sensors of the plurality of sensors onboard the vehicle;

sending, by the one or more processors, to the vehicle computing device, and based at least on the respective scores determined for the individual candidate routes, information related to at least one candidate route that at least in part causes the vehicle computing device to select one of the at least one candidate route as a selected route between the source location and the destination location;

receiving, by the one or more processors, the selected route from the vehicle computing device;

determining, by the one or more processors, geometric associations for landmarks along the selected route; and sending, by the one or more processors, the geometric associations for the landmarks to the vehicle computing device, the sending the geometric associations for the landmarks to the vehicle computing device causing at least in part the vehicle computing device to select one or more of the sensors of the plurality of sensors onboard the vehicle and utilize the selected one or more sensors for locating the landmarks along the selected route based at least on the geometric associations, the vehicle computing device determining a location of the vehicle for performing navigation based at least in part on locating the landmarks along the selected route via the selected one or more sensors.

9. The method as recited in claim 8, further comprising:

receiving the one or more current conditions over a network from one or more computing devices, the one or more current conditions including one or more of: weather conditions, lighting conditions, a time of day, traffic conditions, construction taking place, or local events taking place.

10. The method as recited in claim 8, wherein determining, based on the sensor configuration information and the one or more current conditions, the probability of detection of the individual landmarks by multiple ones of the sensors further comprises:

determining a type of the sensors onboard the vehicle and a field of view of the sensors onboard the vehicle, and determining a probability that multiple different types of the sensors are able to detect the individual landmark.

11. The method as recited in claim 8, further comprising:

segmenting each candidate route of the plurality of candidate routes into a plurality of road segments; and determining the current conditions by determining the current conditions for respective road segments of the plurality of road segments for each candidate route.

12. The method as recited in claim 8, wherein, following locating the landmarks along the selected route based at least in part on the geometric associations, the vehicle computing device determines the location of the vehicle based in part on associating the located landmarks with corresponding landmarks on a navigation map.

13. The method as recited in claim 8, further comprising:

receiving, from the vehicle, sensor data indicating the landmarks detected during traversal of the selected route; and updating an indication of the probability of detection of one or more of the landmarks in a landmark database based at least in part on the received sensor data.

14. The method as recited in claim 8, further comprising:

determining at least one road segment for each candidate route;

determining weights for the individual landmarks based at least on the current conditions for respective road segments, the weights corresponding at least in part to the probability of detection of the individual landmarks;

determining, by the one or more processors, a plurality of candidate routes between the source location and the destination location;

determining a safety score for individual road segments based on the weights of respective landmarks corresponding to the individual road segments;

determining a safety score for the at least one candidate route by aggregating respective safety scores of the individual road segments that comprise the at least one candidate route; and sending the safety score for the at least one candidate route with the information related to the at least one candidate route sent to the vehicle.

15. A non-transitory computer-readable medium including executable instructions, which, when executed by one or more processors, configure the one or more processors to perform operations comprising:

receiving, by the one or more processors, from a vehicle computing device of a vehicle, location information including a source location and a destination location;

determining, by the one or more processors, a plurality of candidate routes between the source location and the destination location;

determining, by the one or more processors, based on the location information, a plurality of landmarks along each candidate route between the source location and the destination location;

determining, by the one or more processors, one or more current conditions corresponding to the plurality of landmarks along each candidate route;

receiving, by the one or more processors, sensor configuration information for a plurality of sensors onboard the vehicle;

determining, by the one or more processors, for individual landmarks of the plurality of landmarks along each candidate route, and based on the sensor configuration information and the one or more current conditions, a probability of detection of the individual landmarks by multiple ones of the sensors of the plurality of sensors onboard the vehicle;

determining, by the one or more processors, respective scores for individual candidate routes of the plurality of candidate routes based on the probability of detection of the individual landmarks of the plurality of landmarks along each candidate route by multiple ones of the sensors of the plurality of sensors onboard the vehicle;

sending, by the one or more processors, to the vehicle computing device, and based at least on the respective scores determined for the individual candidate routes, information related to at least one candidate route that at least in part causes the vehicle computing device to select one of the at least one candidate route as a selected route between the source location and the destination location;

receiving, by the one or more processors, the selected route from the vehicle computing device;

determining, by the one or more processors, geometric associations for landmarks along the selected route; and sending, by the one or more processors, the geometric associations for the landmarks to the vehicle computing device, the sending the geometric associations for the landmarks to the vehicle computing device causing at least in part the vehicle computing device to select one or more of the sensors of the plurality of sensors onboard the vehicle and utilize the selected one or more sensors for locating the landmarks along the selected route based at least on the geometric associations, the vehicle computing device determining a location of the vehicle for performing navigation based at least in part on locating the landmarks along the selected route via the selected one or more sensors.

16. The non-transitory computer-readable medium as recited in claim 15, the operations further comprising:

receiving the one or more current conditions over a network from one or more computing devices, the one or more current conditions including one or more of: weather conditions, lighting conditions, a time of day, traffic conditions, construction taking place, or local events taking place.

17. The non-transitory computer-readable medium as recited in claim 15, wherein determining, based on the sensor configuration information and the one or more current conditions, the probability of detection of the individual landmarks by multiple ones of the sensors further comprises:

determining a type of the sensors onboard the vehicle and a field of view of the sensors onboard the vehicle, and determining a probability that multiple different types of the sensors are able to detect the individual landmark.

18. The non-transitory computer-readable medium as recited in claim 15, the operations further comprising:

segmenting each candidate route of the plurality of candidate routes into a plurality of road segments; and determining the current conditions by determining the current conditions for respective road segments of the plurality of road segments for each candidate route.

19. The non-transitory computer-readable medium as recited in claim 15, wherein, following locating the landmarks along the selected route based at least in part on the geometric associations, the vehicle computing device determines the location of the vehicle based in part on associating the located landmarks with corresponding landmarks on a navigation map.

20. The non-transitory computer-readable medium as recited in claim 15, the operations further comprising:

receiving, from the vehicle, sensor data indicating the landmarks detected during traversal of the selected route; and updating an indication of the probability of detection of one or more landmarks in a landmark database based at least in part on the received sensor data.

\* \* \* \* \*